(12) United States Patent
Simpson

(10) Patent No.: US 8,623,265 B2
(45) Date of Patent: Jan. 7, 2014

(54) CONDUCTIVE POLYMER FOAMS, METHOD OF MANUFACTURE, AND ARTICLES THEREOF

(75) Inventor: Scott Simpson, Woodstock, CT (US)

(73) Assignee: World Properties, Inc., Lincolnwood, IL (US)

( * ) Notice: Subject to any disclaimer, the term of this patent is extended or adjusted under 35 U.S.C. 154(b) by 904 days.

(21) Appl. No.: 12/186,093

(22) Filed: Aug. 5, 2008

(65) Prior Publication Data

US 2008/0311378 A1     Dec. 18, 2008

Related U.S. Application Data

(63) Continuation-in-part of application No. 12/027,018, filed on Feb. 6, 2008, now Pat. No. 7,815,998.

(60) Provisional application No. 60/888,360, filed on Feb. 6, 2007.

(51) Int. Cl.
*B32B 3/00*          (2006.01)

(52) U.S. Cl.
USPC .......................................... 264/440; 264/46.2

(58) Field of Classification Search
USPC .................. 264/46.2, 41, 405, 440, 439, 435; 427/547, 127, 128, 129, 130, 131
See application file for complete search history.

(56) References Cited

U.S. PATENT DOCUMENTS

| | | |
|---|---|---|
| 3,359,145 A | 12/1967 | Salyer et al. |
| 3,523,988 A | 8/1970 | Roehr et al. |
| 4,113,981 A | 9/1978 | Fujita et al. |
| 4,209,481 A | 6/1980 | Kashiro et al. |
| 4,378,322 A | 3/1983 | Atterbury et al. |
| 4,546,037 A | 10/1985 | King |

(Continued)

FOREIGN PATENT DOCUMENTS

| | | |
|---|---|---|
| GB | 2458066 | 10/2011 |
| WO | 2006128741 A1 | 12/2006 |

(Continued)

OTHER PUBLICATIONS

International Search Report for International Application No. PCT/US2008/072240, mailed Apr. 13, 2009, 7 pages.

(Continued)

*Primary Examiner* — Galen Hauth
(74) *Attorney, Agent, or Firm* — Cantor Colburn LLP

(57) ABSTRACT

A method of manufacturing a polymer foam composite is described, the method comprising forming an article having a first surface and an opposite second surface from a precursor composition, the precursor composition comprising a polymer foam precursor composition, and a filler composition comprising a plurality of magnetic, electrically conductive particles; foaming the precursor composition to form a plurality of cells in precursor composition; applying a magnetic field to the foamed precursor composition, wherein the magnetic field is of a strength and applied for a time effective to align the electrically conductive, magnetic particles into mutually isolated chains between the first surface and the opposite second surface of the article; and solidifying the polymer foam precursor composition to provide a polymer foam composite having a density of about 1 to about 125 pounds per cubic foot and a volume resistivity of about $10^{-3}$ ohm-cm to about $10^3$ ohm-cm at a pressure of 60 pounds per square inch. Polymer foam composites made by this method are also described, as well as articles formed therefrom.

14 Claims, 1 Drawing Sheet

(56) References Cited

U.S. PATENT DOCUMENTS

| | | | |
|---|---|---|---|
| 4,548,862 A | 10/1985 | Hartman | |
| 4,602,310 A | 7/1986 | Fenster | |
| 4,643,499 A | 2/1987 | Mitchell | |
| 4,644,101 A | 2/1987 | Jin et al. | |
| 4,737,112 A | 4/1988 | Jin et al. | |
| 4,769,166 A | 9/1988 | Harrison | |
| 4,778,635 A | 10/1988 | Hechtman et al. | |
| 4,793,814 A | 12/1988 | Zifcak et al. | |
| 4,820,376 A * | 4/1989 | Lambert et al. | 216/11 |
| 4,838,347 A | 6/1989 | Dentini et al. | |
| 4,902,857 A | 2/1990 | Cranston et al. | |
| 4,923,739 A | 5/1990 | Jin et al. | |
| 4,960,612 A * | 10/1990 | Dentini et al. | 427/550 |
| 5,045,249 A | 9/1991 | Jin et al. | |
| 5,049,982 A | 9/1991 | Lee et al. | |
| 5,095,337 A | 3/1992 | Yamaguchi | |
| 5,132,058 A | 7/1992 | Suyama et al. | |
| 5,152,937 A | 10/1992 | Tetu | |
| 5,155,302 A | 10/1992 | Nguyen | |
| 5,206,585 A | 4/1993 | Chang et al. | |
| 5,240,761 A | 8/1993 | Calhoun et al. | |
| 5,275,856 A | 1/1994 | Calhoun et al. | |
| 5,304,460 A | 4/1994 | Fulton et al. | |
| 5,313,840 A | 5/1994 | Chen et al. | |
| 5,317,255 A | 5/1994 | Suyama et al. | |
| 5,334,029 A | 8/1994 | Akkapeddi et al. | |
| 5,417,577 A | 5/1995 | Holliday et al. | |
| 5,429,701 A | 7/1995 | Lu | |
| 5,443,876 A | 8/1995 | Koskenmaki et al. | |
| 5,509,815 A | 4/1996 | Jin et al. | |
| 5,522,962 A | 6/1996 | Koskenmaki et al. | |
| 5,591,037 A | 1/1997 | Jin et al. | |
| 5,607,882 A | 3/1997 | Lambert et al. | |
| 5,618,189 A | 4/1997 | Jin et al. | |
| 5,733,322 A | 3/1998 | Starkebaum | |
| 5,769,998 A | 6/1998 | Tanzawa et al. | |
| 5,795,162 A | 8/1998 | Lambert | |
| 5,846,357 A | 12/1998 | Meteer et al. | |
| 5,851,644 A | 12/1998 | McArdle et al. | |
| 6,011,307 A | 1/2000 | Jiang et al. | |
| 6,067,430 A | 5/2000 | Mammino et al. | |
| 6,168,736 B1 | 1/2001 | Harrison et al. | |
| 6,376,393 B1 | 4/2002 | Newton et al. | |
| 6,410,846 B1 | 6/2002 | Benn, Jr. | |
| 6,476,113 B1 * | 11/2002 | Hiles | 524/439 |
| 6,574,114 B1 | 6/2003 | Brindle et al. | |
| 6,613,267 B1 | 9/2003 | Konno | |
| 6,613,976 B1 | 9/2003 | Benn, Jr. | |
| 6,809,280 B2 | 10/2004 | Divigalpitiya et al. | |
| 6,844,378 B1 | 1/2005 | Martin et al. | |
| 6,854,985 B1 | 2/2005 | Weiss | |
| 6,854,986 B2 | 2/2005 | Weiss | |
| 6,915,701 B1 | 7/2005 | Tarler | |
| 7,081,292 B2 | 7/2006 | Kaplo et al. | |
| 7,161,090 B2 | 1/2007 | Mattsson et al. | |
| 7,815,998 B2 | 10/2010 | Simpson et al. | |
| 7,850,870 B2 | 12/2010 | Ahn et al. | |
| 7,875,345 B1 | 1/2011 | Simpson et al. | |
| 2003/0211250 A1 | 11/2003 | Nakamuta et al. | |
| 2005/0062024 A1 | 3/2005 | Bessette et al. | |
| 2005/0286966 A1 | 12/2005 | Gueret | |
| 2006/0269864 A1 | 11/2006 | Tarnawskyj et al. | |
| 2009/0226696 A1 | 9/2009 | Simpson | |

FOREIGN PATENT DOCUMENTS

| | | |
|---|---|---|
| WO | 2008074705 A1 | 6/2008 |
| WO | 2008097570 A1 | 8/2008 |
| WO | 2008097571 A1 | 8/2008 |
| WO | 2010016834 A1 | 2/2010 |

OTHER PUBLICATIONS

Written Opinion for International Search Report for International Application No. PCT/US2008/072240, mailed Apr. 13, 2009, 8 pages.

International Search Report for International Application No. PCT/US2008/001564, mailed Jun. 6, 2008, 5 pages.

Written Opinion for International Search Report for International Application No. PCT/US2008/001564, mailed Jun. 6, 2008, 5 pages.

Shen, et al., Experimental Research and Modeling of Magnetorheological Elastomers, Journal of Intelligent Material Systems and Structures, Jan. 2004, pp. 27-35, vol. 15.

Jolly, et al., The Magnetoviscoelastic Response of Elastomer Composites Consisting of Ferrous Particles Embedded in a Polymer Matrix, Journal of Intelligent Material Systems and Structures, Nov. 1996, pp. 613-622, vol. 7.

Davis, L.C., Model of magnetorheological elastomers, Journal of Applied Physics, Mar. 15, 1999, pp. 3348-3351, vol. 85, No. 6.

Ginder, et al., Magnetorheological Elastomers: Properties and Applications, SPIE, Mar. 1999, pp. 131-138, vol. 3675.

Gallagher, et al., "Transient Liquid Phase Sintering conductive Adhesives As Solder Replacements," 7 pgs., May 1997.

Nusil Silicone Technology, "R-2350 Flame Retardant, TRV Silicone Foam Product Profile," 2 pgs., Dec. 2006.

World Properties, Inc.; Simpson et al; Written Opinion for International Search Report for International Application No. PCT/2008/001564.

World Properties, Inc.; Simpson et al; International Search Report for International Application No. PCT/2008/001564.

Official Action (Feb. 25, 2011) for U.S. Appl. No. 12/404,566, Simpson et al.

Simpson, "Conductive Polymer Foams, Method of Manufacture, and Uses Thereof", Non-Final Office Action dated Oct. 11, 2011, pp. 1-7.

United Kingdom Office Action for UK Application No. 0913320.8, mailed on Mar. 5, 2012.

* cited by examiner

US 8,623,265 B2

CONDUCTIVE POLYMER FOAMS, METHOD OF MANUFACTURE, AND ARTICLES THEREOF

CROSS-REFERENCE TO RELATED APPLICATION

This application is a continuation-in-part of U.S. patent application Ser. No. 12/027,018 filed on Feb. 6, 2008, which claims the benefit of U.S. Provisional Application No. 60/888,360, both of which are incorporated herein by reference in their entirety.

BACKGROUND

This disclosure relates to electrically conductive polymer foams and methods of manufacture thereof, as well as articles comprising the polymer foams.

Electrically conductive polymer foams are used in a wide variety of applications, including as electrical contacting devices, in sensors, and in applications requiring electromagnetic interference (EMI)/radio frequency interference (RFI) shielding and/or electrostatic dissipation. Exemplary materials capable of EMI/RFI shielding include metal foil or metallized fabric wrapped around non-conductive foam gaskets, and non-conductive gaskets coated with conductive materials. Materials suitable for electrostatic dissipation include conductive fillers loaded into various polymers, such as silicones, polyurethanes, and polyolefins. One drawback of using conductive fillers is that the addition of an amount of conductive filler sufficient to achieve high conductivity affects the compressibility and processability of the polymer. In addition, use of such high filler levels increases the cost of the polymer blend. Users are often forced to make a trade-off between the cost and the quality of the material. It has therefore been difficult to achieve high quality, conductive foams for use in EMI/RFI shielding It would advantageous to provide polymer foams wherein the amount of added filler is minimized, while maintaining a suitable electrical conductivity. It would be a further advantage that the compressibility, processability, and other physical properties of the foam that are desired for a particular application not be significantly adversely affected.

There accordingly remains a need in the art for compositions and methods whereby foams can be provided with both electrical conductivity, compressibility and processability, particularly without significant adverse effect on one or more physical properties desired for a particular application.

BRIEF SUMMARY

A method of manufacturing a polymer foam composite comprises forming an article having a first surface and an opposite second surface from a precursor composition, the precursor composition comprising a polymer foam precursor composition, and a filler composition comprising a plurality of magnetic, electrically conductive particles; foaming the precursor composition to form a plurality of cells in precursor composition; applying a magnetic field to the foamed precursor composition, wherein the magnetic field is of a strength and applied for a time effective to align the electrically conductive, magnetic particles into mutually isolated chains between the first surface and the opposite second surface of the article; and solidifying the polymer foam precursor composition to provide the polymer foam composite having a density of about 1 to about 125 pounds per cubic foot and a volume resistivity of about 10–3 Ohm-cm to about 103 ohm-cm at a pressure of 60 pounds per square inch.

A method of manufacturing a polymer foam composite comprises forming an article having a first surface and an opposite second surface from a precursor composition, the precursor composition comprising a polymer foam precursor composition, and a filler composition comprising a plurality of magnetic, electrically conductive particles; foaming the precursor composition to form a plurality of cells in precursor composition; applying a magnetic field to the foamed precursor composition, wherein the magnetic field is of a strength and applied for a time effective to align the electrically conductive, magnetic particles into mutually isolated chains between the first surface and the opposite second surface of the article, wherein the foaming is substantially complete prior to complete alignment of the magnetic, electrically conductive particles; and solidifying the polymer precursor composition to provide the polymer foam composite having a density of about 1 to about 125 pounds per cubic foot and a volume resistivity of about $10^{-3}$ ohm-cm to about $10^3$ ohm-cm at a pressure of 60 pounds per square inch.

Also described is a method of manufacturing a polymer foam composite, the method comprising: mechanically foaming a precursor composition to form a plurality of cells in the precursor composition, wherein the precursor composition comprises: a polymer foam precursor composition, and a filler composition comprising a plurality of magnetic, electrically conductive particles; forming an article having a first surface and an opposite second surface from the mechanically foamed precursor composition; applying a magnetic field of a strength and for a time effective to align the magnetic, electrically conductive particles into mutually isolated chains between the first surface and the opposite second surface of the article, wherein the foaming is substantially complete prior to complete alignment of the magnetic, electrically conductive particles; and curing the polymer precursor composition to provide the polymer foam composite having a density of about 1 to about 125 pounds per cubic foot and a volume resistivity of about $10^{-3}$ ohm-cm to about $10^3$ ohm-cm at a pressure of 60 pounds per square inch.

In another embodiment, a method of manufacturing a polymer foam composite comprises: forming an article having a first surface and an opposite second surface from a precursor composition, the precursor composition comprising a polymer foam precursor composition, and a filler composition comprising a plurality of magnetic, electrically conductive particles; foaming the precursor composition to form a plurality of cells in precursor composition; applying a magnetic field to the foamed precursor composition, wherein the magnetic field is of a strength and applied for a time effective to align the electrically conductive, magnetic particles into mutually isolated chains between the first surface and the opposite second surface of the article; and solidifying the polymer foam precursor composition; and removing an amount of the first and/or second surface of the solidified foam sufficient to at least partially expose the ends of the mutually isolated chains, to provide the polymer foam composite having a density of about 1 to about 125 pounds per cubic foot and a volume resistivity of about $10^{-3}$ ohm-cm to about $10^3$ ohm-cm at a pressure of 60 pounds per square inch.

A specific method of manufacturing a polyurethane foam composite comprises mechanically foaming a precursor composition comprising a polyisocyanate component, an active hydrogen-containing component reactive with the polyisocyanate component, a surfactant, a catalyst, and a filler composition comprising a plurality of magnetic, electrically conductive particles to form cells; casting the froth to form a layer having a first surface and an opposite second surface; exposing the layer to a magnetic field to align the magnetic, electrically conductive particles into mutually isolated chains that essentially continuously span the layer between the first surface and the second surface, wherein the foaming is substantially complete prior to applying the magnetic field; and curing the layer to produce the polyurethane foam composite having a volume resistivity of about $10^{-3}$ ohm-cm to about $10^3$ ohm-cm at a pressure of 60 pounds per square inch, and wherein the distance between the first surface and the second surface is greater than 1.5 times the average diameter of the cells.

Another specific method of manufacturing a silicone foam comprises: casting a mixture comprising a polysiloxane polymer having hydride substituents, a catalyst, and a filler composition comprising a plurality of magnetic, electrically conductive particles; to form a layer having a first surface and an opposite second surface; foaming the mixture; curing the mixture in an applied magnetic field to align the magnetic, electrically conductive particles into mutually isolated chains that essentially continuously span the foam between a first surface and a second opposite surface of the foam; and removing an amount of the first and/or second surface of the cured foam sufficient to at least partially expose the ends of the mutually isolated chains, to produce the silicone foam composite having a volume resistivity of about $10^{-3}$ ohm-cm to about $10^3$ ohm-cm at a pressure of 60 pounds per square inch.

Also described is a polymer foam composite manufactured by the foregoing methods.

In another embodiment, a polymer foam composite comprises a polymer foam having a first surface and an opposite second surface, and electrically conductive, magnetic particles aligned into mutually isolated chains between the first surface and the opposite second surface of the foam; wherein the foam has a density of about 1 to about 125 pounds per cubic foot; a volume resistivity of about $10^{-3}$ ohm-cm to about $10^3$ ohm-cm at a pressure of 60 pounds per square inch.

Articles are also described, comprising a polymer foam composite manufactured by the above-described methods.

The foams, articles, and methods of manufacture thereof are further described in the following drawings, detailed description, and examples.

BRIEF DESCRIPTION OF THE DRAWINGS

The disclosed subject matter is particularly pointed out and distinctly claimed in the claims at the conclusion of the specification. The foregoing features and advantages of the disclosed embodiments are apparent from the following detailed description taken in conjunction with the accompanying drawing in which:

DETAILED DESCRIPTION

Figure 1:
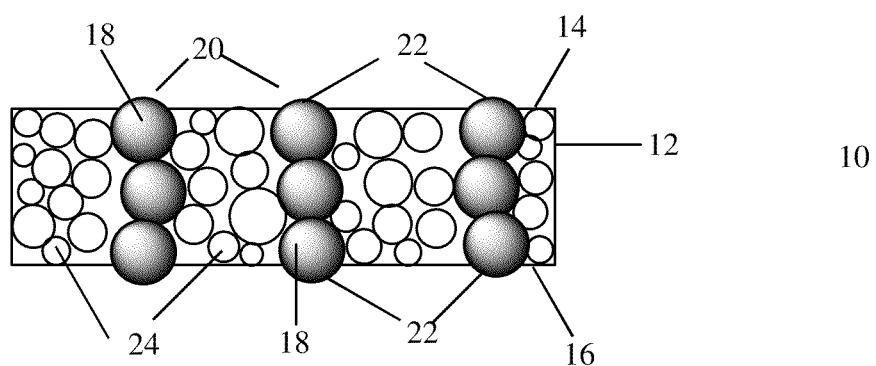
FIG. 1 is a schematic diagram of an exemplary electrically conductive polymer foam.
Figure 2:
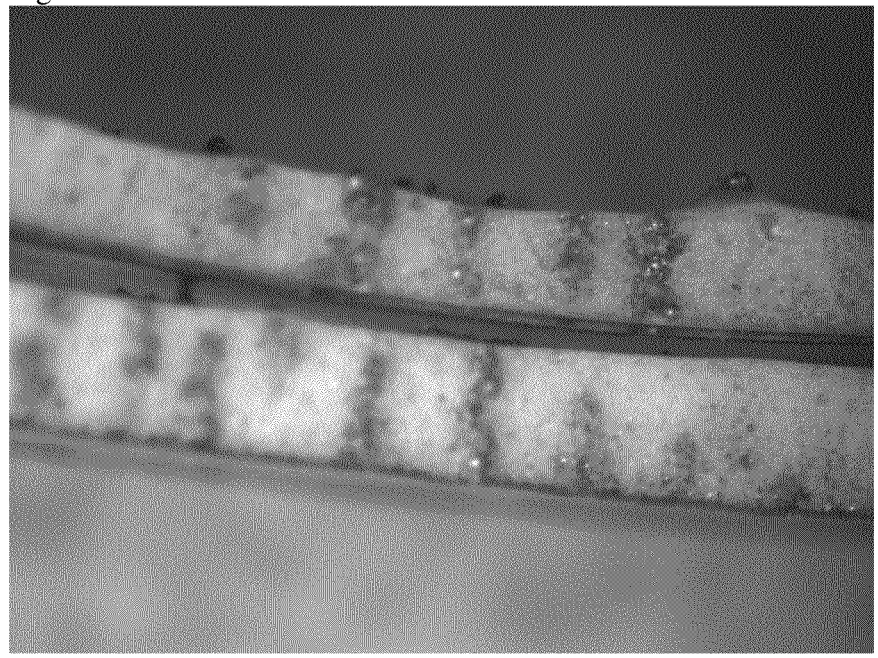
FIG. 2 is a micrograph of a cross-section of an exemplary electrically conductive polyurethane foam manufactured in accordance with the present method.

The inventors hereof have unexpectedly found that it is possible, in polymer foams, to magnetically align electrically conductive, magnetic particles within the foams to provide high electrical conductivity to the polymer foam composites. While such magnetic alignment has been demonstrated in solid polymers, it is unexpected that this technique can also be used to provide electrical conductivity to cellular polymers.

In one embodiment, it has been found that excellent electrical conductivity can be achieved by forming a foamed precursor composition, magnetically aligning electrically conductive, magnetic particles in the precursor composition into mutually isolated chains spanning two surfaces of the foam, preventing additional foaming of the precursor composition after alignment of the particles, and curing or cooling the precursor composition to form the foam.

In another embodiment, it has been found that enhanced electrical conductivity can be attained by forming a foamed precursor composition, magnetically aligning electrically conductive, magnetic particles in the precursor composition into mutually isolated chains spanning two surfaces of the foam, curing or cooling the precursor composition to form the foam, and removing the top layer of the foam surfaces to at least partially expose the ends of the mutually isolated chains of electrically conductive, magnetic particles.

The polymer foams produced by these methods are electrically conductive, and also substantially retain one or more of their compressibility, flexibility, compression set resistance, cell uniformity, and the like. These materials are particularly suitable for use in the formation of articles that provide EMI/RFI shielding.

The electrically conductive, magnetic particles used to form the foam composites comprise both an electrically conductive material and a magnetic material, which can be the same or different material. Exemplary electrically conductive materials include conductive metals such as gold, silver, nickel, copper, aluminum, chromium, cobalt, iron, and the like, as well as oxides or alloys comprising at least one of the foregoing metals. Suitable magnetic materials include ferromagnetic and paramagnetic materials. Exemplary magnetic materials include iron, nickel, and cobalt, as well as the lanthanide rare earth elements, and the like, and oxides, ceramics, and alloys of at least one of the foregoing magnetic materials. In one embodiment, the magnetic, electrically conductive material is also a non-oxidizing material.

The particles can be wholly formed from the magnetic, electrically conductive material(s), or the magnetic, electrically conductive material(s) can be used as a core or a coating, together with a non-magnetic material, a non-electrically conductive material, or non-magnetic, non-electrically conductive material. For example, an electrically conductive material can be used to coat a core comprising a magnetic material such as an iron particle, or a magnetic and electrically conductive material could be used to coat a non-magnetic, non-electrically conductive material such as glass, including glass microballoons. Silver and nickel coatings are especially useful. Specific magnetic, electrically conductive particles include silver-coated nickel particles, silver-coated iron particles, nickel particles, and nickel-coated particles such as nickel-coated aluminum trihydroxide ($Al(OH)_3$, "ATH"), and nickel-coated glass particles, and in particular nickel coated stainless steel particles.

The electrically conductive, or magnetic and electrically conductive material can be deposited on the core particles by coating techniques such as vapor deposition, electroless plating, and the like. In one embodiment, an electroless plating process is used to deposit nickel onto aluminum trihydroxide. In another embodiment, vapor deposition of nickel carbonyl is used to provide a nickel coating. A sufficient amount of electrically conductive material is coated onto the magnetically conductive particles such that the particles, when used to form composites, impart the desired level of conductivity to the composite, without significantly adversely affecting the desired properties of the polymer. It is not necessary for all of the particles to be coated, or for the coating to completely cover each particle. Particles that are at least substantially coated can therefore be used. For example, in a given batch of particles, at least about 60% of the total surface area of the particles is coated, specifically at least about 70%, more specifically at least about 80%, and even more specifically at least about 90% of the total surface area of the particles is coated. Coating thickness can vary widely. In one embodiment, the thickness of the coating is about 0.004 to about 0.2 mils (about 0.1 to about 5 micrometers), specifically about 0.02 to about 0.1 mils (about 0.526 to about 3 micrometers).

The particles can have a variety of irregular or regular shapes, e.g., spherical, flake, plate- or rod-like. Particles having a combination of different shapes can be used. Spherical or rod-like shapes are preferred. In one embodiment, particles having an aspect ratio (length/width) of greater than one are used. The particle size is not particularly limited, and can have, for example, an average largest dimension of about 0.250 to about 500 micrometers. Specifically, the average largest dimension of the particles can be about 1 to about 500 micrometers, more specifically, about 100 to about 300 micrometers. This average size can be achieved with single filler, or a mixture of fillers having various average particle sizes. In one embodiment, the particles are spherical, and have an average diameter of about 180 to about 250 micrometers. It is also possible to use expandable particles (e.g., nickel-coated polyvinylidene chloride particles) or deformable particles (e.g., nickel-coated soft beads) to increase the area of interparticle contact.

The particles can be surface treated to alter their surface characteristics. For example, the particles can be coated with a hydrophobic material to reduce interaction with a polymer precursor composition. An exemplary coating material is a silane (which can be useful for polyurethane composites) or a fluorosilicone (which can be useful for silicone composites). While not wanting to be bound by theory, it is believed that treatment of the particles with a silane or silicone reduces wetting of the particles by one or more components of the precursor formation or the polymer itself. Control of the wetting of the particles can control the formation of a skin over the particles.

Other electrically conductive fillers can additionally be used to attain a desired conductivity, such as carbon black, carbon fibers such as PAN fibers, metal-coated fibers or spheres such as metal-coated glass fibers, metal-coated carbon fibers, metal-coated organic fibers, metal coated ceramic spheres, metal coated glass beads and the like, inherently conductive polymers such as polyaniline, polypyrrole, polythiophene in particulate or fibril form, conductive metal oxides such as tin oxide or indium tin oxide, and combinations comprising at least one of the foregoing conductive fillers can also be used. The relative ratio of magnetic, electrically conductive filler to electrically conductive filler can vary widely, depending on the types of filler used and the desired properties of the foam. In general, the filler composition can comprise 50 to 100 weight percent (wt %) magnetic, electrically conductive material and 0 to 50 wt % electrically conductive filler, more specifically 75 to 99 wt % magnetic, electrically conductive filler and 1 to 25 wt % electrically conductive filler, each based on the total weight of the filler composition.

The relative amount of the filler composition used in the manufacture of the electrically conductive polymer foam will vary depending on the type of polymer, the type of particles, the intended use, the desired electrical conductivity, foam cell structure, processing characteristics, and similar factors. In one embodiment, the electrically conductive polymer foam composite comprises a total filler content about 10 to about 90 wt %, specifically about 20 to about 80 wt %, even more specifically, about 30 to about 70 wt %, each based on the total weight of the electrically conductive polymer foam. Alternatively, the amount of filler can be described as a percent of the volume (vol %) of the precursor formulation for the electrically conductive polymer foam prior to foaming. In one embodiment, the foam comprises about 1 to about 30 vol % filler particles, specifically about 2 to about 20 vol %, more specifically about 5 to about 17 vol % of the polymer foam precursor formulation prior to foaming.

As used herein, a "foam" is a material having a cellular structure and a density of about 5 to about 150 pounds per cubic foot (pcf) (80 to 2402 kilogram per cubic meter (kcm)), specifically less than or equal to about 125 pcf (2002 kcm), more specifically less than or equal to about 100 pcf (1601 kcm), and still more specifically about 10 to about 60 pcf (160 to 961 kcm). Such foams have a void content of about 20 to about 99%, specifically about 30% to about 95%, and more specifically about 50% to about 90%, each based upon the total volume of the foam. The foams can be open- or closed-cell.

Polymers for use in the foams can be selected from a wide variety of thermoplastics, blends of thermoplastics, or thermosets. Exemplary thermoplastics that can be used include polyacetals, polyacrylics, styrene acrylonitrile, polyolefins, acrylonitrile-butadiene-styrene, polycarbonates, polystyrenes, polyethylene terephthalates, polybutylene terephthalates, polyamides such as, but not limited to Nylon 6, Nylon 6,6, Nylon 6,10, Nylon 6,12, Nylon 11 or Nylon 12, polyamideimides, polyarylates, polyurethanes, ethylene propylene rubbers (EPR), polyarylsulfones, polyethersulfones, silicones, polyphenylene sulfides, polyvinyl chlorides, polysulfones, polyetherimides, polytetrafluoroethylenes, fluorinated ethylene propylenes, polychlorotrifluoroethylenes, polyvinylidene fluorides, polyvinyl fluorides, polyetherketones, polyether etherketones, polyether ketone ketones, and the like, or a combination comprising at least one of the foregoing thermoplastics.

Exemplary blends of thermoplastics that can be used in the polymer foams include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, polyethylene terephthalate/polybutylene terephthalate, styrene-maleic anhydride/acrylonitrile-butadiene-styrene, polyether etherketone/polyethersulfone, styrene-butadiene rubber, polyethylene/nylon, polyethylene/polyacetal, ethylene propylene rubber (EPR), and the like, or a combination comprising at least one of the foregoing blends.

Exemplary polymeric thermosets that can be used in the polymer foams include polyurethanes, epoxys, phenolics, polyesters, polyamides, silicones, and the like, or a combination comprising at least one of the foregoing thermosets. Blends of thermosets as well as blends of thermoplastics with thermosets can be used.

Other additives known for use in the manufacture of foams can be present, for example other fillers, such as reinforcing fillers (e.g., woven webs, silica, glass particles, and glass microballoons), fillers used to provide thermal management, or flame retardant fillers or additives. Exemplary flame retardants include, for example, metal hydroxides containing aluminum, magnesium, zinc, boron, calcium, nickel, cobalt, tin, molybdenum, copper, iron, titanium, or a combination thereof, for example aluminum trihydroxide, magnesium hydroxide, calcium hydroxide, iron hydroxide, and the like; a metal oxide such as antimony oxide, antimony trioxide, antimony pentoxide, iron oxide, titanium oxide, manganese oxide, magnesium oxide, zirconium oxide, zinc oxide, molybdenum oxide, cobalt oxide, bismuth oxide, chromium oxide, tin oxide, nickel oxide, copper oxide, tungsten oxide, and the like; metal borates such as zinc borate, zinc metaborate, barium metaborate, and the like; metal carbonates such as zinc carbonate, magnesium carbonate, calcium carbonate, barium carbonate, and the like; melamine cyanurate, melamine phosphate, and the like; carbon black, expandable graphite flakes (for example those available from GrafTech International, Ltd. under the tradename GRAFGUARD), and the like; nanoclays; and brominated compounds. Exemplary flame retardant materials are magnesium hydroxides, nanoclays, and brominated compounds. In one embodiment, flame retardance of the polymer foam meets certain Underwriter's Laboratories (UL) standards for flame retardance. For example, the polymer foam has a rating of V-1, preferably V-0 under UL Standard 94.

Still other additives that can be present include dyes, pigments (for example titanium dioxide and iron oxide), antioxidants, antiozonants, ultraviolet (UV) stabilizers, conductive fillers, catalysts for cure of the polymer, crosslinking agents, and the like, as well as combinations comprising at least one of the foregoing additives.

In a general process for producing the polymer foam composite, a polymer foam precursor composition is combined with the filler composition comprising magnetic, electrically conductive particles, and any other optional additives, and used to form an article, e.g. a layer, having a first side and an opposite second side that is then exposed to a magnetic field. The layer is exposed to a magnetic field at a strength and for a time effective to substantially align the magnetic, electrically conductive particles in mutually isolated chains extending from a first surface of the layer to an opposite, second surface. Foaming can be performed at any point or more points in the process prior to cure (or cooling in the case of thermoplastic polymers), for example before forming the article, during forming the article, or after forming the article; before exposure to the magnetic field, during exposure to the magnetic field, or after exposure to the magnetic field; or a combination thereof, for example before forming the article and during exposure to the magnetic field, or after forming the article and during exposure to the magnetic field. In some embodiments, foaming will be substantially complete prior to exposure to the magnetic field. In other embodiments, foaming will continue during exposure to the magnetic field, but both foaming and exposure to the magnetic field will end at the same time. In still other embodiments, foaming will continue to occur after exposure to the magnetic field.

Foaming the precursor composition is by mechanical foaming (also known as mechanical frothing), blowing (chemical or physical), or a combination comprising at least two of mechanical foaming, chemical blowing, and physical blowing.

In a specific embodiment, foaming the precursor composition is by mechanical foaming. Optionally in this embodiment, the precursor composition can be further foamed by chemical blowing, physical blowing, or a combination comprising mechanical foaming, chemical blowing, and physical blowing. It is to be understood, however, that in some embodiments, only mechanical foaming is used. Mechanical foaming can include whipping, mixing, stirring, or the like, or a combination comprising at least one of the foregoing foaming methods. Mechanical foaming includes the mechanical incorporation of a gas into a precursor composition to form a foam or froth. Foaming can also include agitation of a precursor composition containing cells to modify the cell size and distribution of the cells by dividing or breaking cells, thereby selecting the cell size and cell size distribution. Blowing is performed using a chemical or physical blowing agent (e.g., a chlorofluorocarbon) to impart gas into a precursor composition, thereby forming cells. Blowing can occur before or after foaming, or both before and after foaming.

It has been found in one embodiment that optimal conductivity is achieved by substantially completely foaming the polymer foam precursor composition prior to exposure to the magnetic field. In this embodiment, no or substantially no additional foaming occurs after alignment of the electrically conductive, magnetic particles. Without being bound by theory, it is believed that additional foaming after alignment of the magnetic, electrically conductive particles results in a layer of foam or a skin at the surfaces of the foam that covers the particles at the surface and effectively insulates them from electrical contact at the surface. Therefore, in one embodiment, the magnetic field is applied at a strength and for a time effective to both substantially align the magnetic, electrically conductive particles, and to result in at least partial exposure of one or more particles at one or both of the surfaces of the foam. When any of these techniques are used, it is not necessary to limit the thickness of the article relative to the cell size of the foam.

In another embodiment, it has been found that the electrical conductivity of the polymer composite foams can be improved by removing the outer surface of the cured or cooled (in the case of thermoplastic) foams to expose the particles at the ends of the mutually isolated chains. This embodiment has the advantage of allowing a wide variety of foaming and curing or cooling methods, because it is not necessary to prevent additional foaming of the polymer precursors after alignment of the electrically conductive, magnetic particles. Exemplary processes include buffing, grinding, or the like. Buffing and grinding involve abrasive removal of the surface of the foam. Other exemplary post-processes include chemical removal, flame burn off, dielectric burn through, and corona surface treatment, or the like. These processes involve the decomposition of the surface of the foam using a chemical, flame, electric discharge, or corona, respectively. Processing can also be accomplished by adhesive peeling, wherein the surface skin of the foam is removed by adhering the surface skin to a non-releasing carrier, followed by removal of the non-releasing carrier and the surface skin. Processing can also include a combination comprising at least one of the foregoing post-processing methods.

In still another embodiment, the foam is formulated to have a high degree of cure (crosslinking) in order to enhance the conductivity of the polymer foam composite. Highly cured foams tend to shrink during the cure, which exposes the ends of the mutually isolated chains of electrically conductive, magnetic particles.

Magnetic field strengths suitable for particle alignment depend on a variety of factors, including the viscosity of the foam, foam thickness, and density, and the nature of the particle. In one embodiment, a higher field strength is advantageous for thinner foams. In one embodiment, the magnetic field strength has a magnetic flux density of about 50 to about 2000 Gauss, specifically, about 100 to about 1500 Gauss, and more specifically about 125 to about 1200 Gauss.

In one embodiment, the magnetic field is aligned with the layer such that the magnetic electrically conductive particles are organized into mutually isolated chains that are perpendicular to an x-y plane of the layer as a result of application of a magnetic field perpendicular to the first and second surfaces of the article, e.g., a layer. FIG. 1 shows a schematic diagram of a cross-section of an electrically conductive polymer foam composite 10. The polymer foam composite 10 comprises a polymer foam 12 having cells 24 therein, a first surface 14 and a second surface 16, and comprising magnetic, electrically conductive particles 18. The magnetic, electrically conductive particles 18 are organized into chains 20 that substantially align with the magnetic field along a z-axis, which is perpendicular to the plane of the polymer foam composite 10, that is, perpendicular to the first surface 14 and/or the second surface 16. The magnetic, electrically conductive particles 18 can organize into chains 20 of irregular shapes, but the chains 20 are substantially aligned with the magnetic field. As shown in FIG. 1, the ends 22 of the chains 20 are exposed at the surfaces 14, 16 of foam 12. Such exposure enhances the conductivity of the polymer foam composites. In general, each particle at the end of the chain protrudes from the surface by about 10% to about 70% of the particle diameter, specifically about 20 to about 50% of the particle diameter. The methods disclosed herein can be practiced to result in exposure of the ends of the particle chains without the need to physically remove one or both of outer surfaces 14, 16. For example, when foaming is complete prior to application of the magnetic field, the strength of the magnetic field can be adjusted to cause alignment of the particles so that the ends of the chains are partially exposed at one or both of surfaces 14, 16.

Alternatively, the magnetic, electrically conductive particles are organized into columns that are aligned on an incline relative to the z-axis as a result of application of a magnetic field at an angle of incline relative to the z-direction of desired conductivity transverse to the x-y plane of the polymer foam. In one embodiment, the angle of the incline (θ) is about 1° to about 45° relative to either side of the z-axis, specifically about 5° to about 30°, and more specifically about 10° to about 20° relative to either side of the z-axis. Without being bound by theory, a foam comprising mutually isolated chains aligned on an incline relative to the z-axis may be more compressible and the columns less likely to be damaged or destroyed as the columns may deflect more easily in the direction of the compression force.

The foam can be left uncured during exposure to the magnetic field; it can be partially cured prior to exposure to the magnetic field; it can be partially cured during exposure to the magnetic field; it can be fully cured during exposure to the magnetic field; or it can be fully cured following exposure to the magnetic field. In one embodiment, the foam is partially cured prior to exposure to the magnetic field, and fully cured during exposure to the magnetic field. In another embodiment, the foam is partially cured prior to or during exposure to the magnetic field, and fully cured after exposure to the magnetic field.

The diameters of the cells in the foam will vary depending on the polymer used, the foaming technique, and foaming parameters, and like considerations. In an advantageous feature of mechanical foaming, cells are produced having smaller average diameters than are usually provided by chemical or physical blowing. For example, cells having an average diameter as low as 50 micrometers can be produced. The methods described herein generally produce foams with cells having an average diameter of 65 to 1,000 micrometers, specifically 10 to 500 micrometers, more specifically 50 to 250 micrometers.

In a particularly advantageous feature, the thickness (distance between the first and second surfaces) of the polymer foam composites is limited more by the resistance of the particles themselves plus the resistance of the interparticle contacts, rather than the average cell size of the polymer foam composites. Thus, adjusting the thickness of the polymer composite based on the average cell size of the foam is not necessary to obtain good conductivity, provided that the magnetic, electrically conductive particles are sufficiently close to or exposed at the foam surfaces. In one exemplary embodiment, the thickness of the polymer foam composite is 1 to 10,000 times the average cell diameter, specifically 1.5 to 1,500 times the average cell diameter, more specifically 2 to 100 times the average cell diameter, still more specifically 3 to 10 times the average cell diameter. In addition, it has been found that good results have been obtained with an average cell size of greater than 20% of the average particle size of the electrically conductive, magnetic particles, specifically great than 25% of the particle size, and even more specifically greater than 30% of the average particle size.

The present compositions and methods are especially useful in the manufacture of polymer foam layers. In a specific embodiment, the layer is formed by casting the mechanically frothed precursor composition (which contains the polymer precursor composition, the filler composition, and any additional additives) onto a carrier substrate, to provide a foam layer having a first surface and an opposite second surface disposed on the carrier substrate, wherein the first surface of the layer is in contact with the substrate. Optionally, a second (top) carrier substrate is disposed on and in contact with the second surface of the cast layer. Further foaming of the layer by blowing can be effected before or after casting, and/or before or after disposing the second carrier substrate. In one embodiment, the layer is substantially completely foamed prior to disposing the second carrier substrate.

In practice, the carrier or carriers can be played out from supply rolls and ultimately rewound on take-up rolls upon separation from the cured foam. The selection of materials for the top and bottom carriers, will depend on factors such as the desired degree of support and flexibility, the desired degree of releasability from the cured foam, cost, and the like considerations. Paper, thin sheets of metal such as copper or aluminum, or polymer films such as polyethylene terephthalate, silicone, polycarbonate, PTFE, polyimide, or the like can be used. The material can be coated with a release coating.

In one embodiment, the carrier(s) are electrically conductive, for example an electrically conductive layer such as a copper foil. An electrically conductive adhesive can be used between the conductive carrier and the polymer foam composite layer. Use of an electrically conductive metallic foil in particular can provide both dimensional stability and x-y conductivity. Thus, in one embodiment, an article comprises an electrically conductive, e.g., a metallic layer, on a first side of the foam composite layer. Optionally, the side opposite the electrically conductive layer can be post-processed to remove the outer layer of foam in order to further enhance the conductivity of the article. In another embodiment, an article comprises an electrically conductive, e.g., a metallic layer, on each of a first side and a second side of the article, wherein the second side is opposite the first side.

In a specific embodiment, the carrier is magnetic, or both electrically conductive and magnetic. An exemplary electrically conductive, magnetic foil is a foil comprising nickel and copper, such as Olin CuproNickel 706, which comprises 10 wt % nickel in copper, or Olin CuproNickel 715, which comprises 30 wt % nickel in copper. Use of a magnetic top and/or bottom carrier promotes contact of the ends of the electrically conductive, magnetic particle mutually isolated chains with the carrier, thereby enhancing the conductivity of the polymer foam composite. It is thus possible to achieve a highly conductive polymer foam composite without post-processing removal of the outer layer of the foam, or without ensuring that no or substantially no foaming occurs after particle alignment.

Thus, in one embodiment, an article comprises a magnetic, electrically conductive layer on a first side of the foam composite layer. A very strong magnetic field can be used to align the particles, in order to cause the particles to protrude through the second side, thereby fully or partially exposing the ends of the mutually isolated chains. The degree of exposure of the ends of the chains can be adjusted by adjusting the strength of the magnetic field or controlling the degree of foaming that occurs after the magnetic field is applied. Additionally, or in the alternative, the side opposite the electrically conductive, magnetic layer is post-processed to remove the outer layer of foam, to further enhance the conductivity of the article. In another embodiment, an article comprises an electrically conductive, magnetic layer on each of a first side and a second side of the article, wherein the second side is opposite the first side.

In another embodiment, a layer of electrically conductive, magnetic particles can be disposed on the carrier (including an electrically conductive or electrically conductive and magnetic layer) to enhance the conductivity of the polymer foam composite. For example, the carrier can be coated with a layer of electrically conductive, magnetic particles in a solvent/polymer mixture, followed by removal of the solvent. The amount of polymer used is sufficient to adhere the particles to the carrier, while leaving the particles at least partially exposed. These particles can then act as "seeds" for column formation, and allow more precise column placement. If the particles are seeded in a pattern, the columns form following the pattern.

Either or both carriers can be coated with a material intended to be transferred to a surface of the cured foam, for example a pressure sensitive adhesive that is releasable from the carrier, or a conductive adhesive that is releasable from the carrier. A fibrous web or other filler material can be disposed on the surface of the carrier, and thereby become ultimately incorporated into the cured foam. In another embodiment, the foam cures to one or both of the carriers. Thus, one or both carriers can form part of the final product, instead of being separated from the foam and being rewound on a take-up roll. Alternatively, a conveyor belt can be used as the bottom carrier.

A foam layer can be manufactured using a carrier having a smooth or a textured, e.g., matte surface. In a specific embodiment, the carrier(s) have a smooth surface. A polymer foam composite prepared using a carrier with a smooth surface will have a substantially smoother surface than a polymer foam composite prepared without a smooth carrier. Specifically, a polymer foam composite prepared using a top carrier and a bottom carrier, both with a smooth surface, can have a smoother surface, lower density, non-protrusion of particles above the surface, and better sealing. A textured surface can be useful to guide the location of column formation or particles at the surface. In some embodiments, use of a textured surface can provide enhanced exposure of particle chains.

In a specific embodiment, however, only a single carrier is used. As discussed above, it has been found that at least partial exposure of the electrically conductive, magnetic particles from the surface of the foam results in more electrically conductive foams. Use of a top carrier has been found to promote formation of a skin that insulates the particles. Good conductivities can still be achieved, but only with increased compression. It is thus advantageous to form the foam layer using only a single bottom carrier, and no top carrier.

Where it is desirable to use a top carrier, the resulting layers (or other articles) can be treated after curing to increase the polymer foam composite conductivity, by removing the outer surface of the foam to better expose the particles at the surface of the polymer composite article. Exemplary removing processes include buffing, grinding, or the like. Buffing and grinding involve abrasive removal of the surface of the foam. Other exemplary removing include chemical removal, flame burn off, dielectric burn through, laser ablation, corona surface treatment, or the like. These processes involve the decomposition of the surface of a foam using a chemical, flame, electric discharge, or corona, respectively. Removing can also be accomplished by adhesive peeling, wherein the surface skin of a foam is removed by adhering the surface skin to a non-releasing carrier, followed by removal of the non-releasing carrier and the surface skin. Removing can also include a combination comprising at least one of the foregoing removing methods. One, two, or all surfaces of the foam article can be post-processed.

Specific polymers for use in the manufacture of the foams include polyurethane foams and silicone foams. As is known in the art, a polymer foam is manufactured from a precursor composition that is mixed prior to foaming.

Polyurethane foams are particularly useful, as they can be substantially completely foamed by mechanical foaming prior to casting, and thus prior to application of the magnetic field. Such foams can also be manufactured to have excellent mechanical properties, including compression set resistance, softness, toughness, and compressibility. Exemplary compositions for the formation of polyurethane foams are set forth, for example, in U.S. Pat. Nos. 5,733,945, 6,559,196, and 7,338,983.

Polyurethane foams are formed from a polymer precursor composition comprising an organic polyisocyanate component, an active hydrogen-containing component reactive with the polyisocyanate component, a surfactant, and a catalyst. In an exemplary process, forming the foam composite comprises mechanically foaming the precursor composition, e.g., with a mechanical mixer, to form a heat curable froth that is substantially structurally and chemically stable, but workable at ambient conditions; casting the foamed precursor composition; applying a magnetic field to align the electrically conductive, magnetic particles; and curing the froth to form a cured foam. In one embodiment, foaming can be used in conjunction with introduction of a physical blowing agent into the froth to further reduce foam density. The chemical or physical blowing agent can be introduced before or after foaming, preferably before foaming. In a preferred embodiment, no or substantially no further foaming occurs after applying the magnetic field.

Suitable organic polyisocyanates include isocyanates having the general formula:

$$Q(NCO)_i$$

wherein i is an integer of two or more and Q is an organic radical having the valence of i, wherein i has an average value greater than 2. Q can be a substituted or unsubstituted hydrocarbon group (i.e., an alkylene or an arylene group), or a group having the formula $Q^1$-Z-$Q^1$ wherein $Q^1$ is an alkylene or arylene group and Z is —$CH_2$—, —O—, —O-$Q^1$-S, —CO—, —S—, —S-$Q^1$-S—, —SO—, —$SO_2$—, alkylene or arylene. Exemplary polyisocyanates include hexamethylene diisocyanate, 1,8-diisocyanato-p-methane, xylyl diisocyanate, diisocyanatocyclohexane, phenylene diisocyanates, tolylene diisocyanates, including 2,4-tolylene diisocyanate, 2,6-tolylene diisocyanate, and crude tolylene diisocyanate, bis(4-isocyanatophenyl)methane, chlorophenylene diisocyanates, diphenylmethane-4,4'-diisocyanate (also known as 4,4'-diphenyl methane diisocyanate, or MDI) and adducts thereof, naphthalene-1,5-diisocyanate, triphenylmethane-4,4',4"-triisocyanate, isopropylbenzene-alpha-4-diisocyanate, and polymeric isocyanates such as polymethylene polyphenylisocyanate.

Q can also represent a polyurethane radical having a valence of i in which case Q(NCO)$_i$ is a composition known as a prepolymer. Such prepolymers are formed by reacting a stoichiometric excess of a polyisocyanate as above with an active hydrogen-containing component, especially the polyhydroxyl-containing materials or polyols described below. In one embodiment, the polyisocyanate is employed in proportions of about 30 percent to about 200 percent stoichiometric excess, the stoichiometry being based upon equivalents of isocyanate group per equivalent of hydroxyl in the polyol. The amount of polyisocyanate employed will vary slightly depending upon the nature of the polyurethane being prepared.

The active hydrogen-containing component can comprise polyether polyols and polyester polyols. Suitable polyester polyols are inclusive of polycondensation products of polyols with dicarboxylic acids or ester-forming derivatives thereof (such as anhydrides, esters and halides), polylactone polyols obtainable by ring-opening polymerization of lactones in the presence of polyols, polycarbonate polyols obtainable by reaction of carbonate diesters with polyols, and castor oil polyols. Suitable dicarboxylic acids and derivatives of dicarboxylic acids which are useful for producing polycondensation polyester polyols are aliphatic or cycloaliphatic dicarboxylic acids such as glutaric, adipic, sebacic, fumaric and maleic acids; dimeric acids; aromatic dicarboxylic acids such as, but not limited to phthalic, isophthalic and terephthalic acids; tribasic or higher functional polycarboxylic acids such as pyromellitic acid; as well as anhydrides and second alkyl esters, such as, but not limited to maleic anhydride, phthalic anhydride and dimethyl terephthalate.

Additional active hydrogen-containing components are the polymers of cyclic esters. Suitable cyclic ester monomers include, but are not limited to δ-valerolactone, ∈-caprolactone, zeta-enantholactone, the monoalkyl-valerolactones, e.g., the monomethyl-, monoethyl-, and monohexyl-valerolactones. Suitable polyester polyols include caprolactone based polyester polyols, aromatic polyester polyols, ethylene glycol adipate based polyols, and mixtures comprising any one of the foregoing polyester polyols. Exemplary polyester polyols are polyester polyols made from ∈-caprolactones, adipic acid, phthalic anhydride, terephthalic acid, or dimethyl esters of terephthalic acid.

The polyether polyols are obtained by the chemical addition of alkylene oxides, such as ethylene oxide, propylene oxide and mixtures thereof, to water or polyhydric organic components, such as ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3-cyclohexene-1,1-dimethanol, 4-methyl-3-cyclohexene-1,1-dimethanol, 3-methylene-1,5-pentanediol, diethylene glycol, (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy-1,5-pentanediol, 2-allyloxymethyl-2-methyl-1,3-propanediol, [4,4-pentyloxy)-methyl]-1,3-propanediol, 3-(o-propenylphenoxy)-1,2-propanediol, 2,2'-diisopropylidenebis(p-phenyleneoxy)diethanol, glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy)methyl]-ethane, 1,1,1-tris[2-hydroxypropoxy)-methyl]propane, diethylene glycol, dipropylene glycol, pentaerythritol, sorbitol, sucrose, lactose, alpha-methylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, and the like. The alkylene oxides employed in producing polyoxyalkylene polyols normally have from 2 to 4 carbon atoms. Exemplary alkylene oxides are propylene oxide and mixtures of propylene oxide with ethylene oxide. The polyols listed above can be used per se as the active hydrogen component.

A suitable class of polyether polyols is represented generally by the following formula

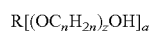

wherein R is hydrogen or a polyvalent hydrocarbon radical; a is an integer (i.e., 1 or 2 to 6 to 8) equal to the valence of R, n in each occurrence is an integer from 2 to 4 inclusive (specifically 3) and z in each occurrence is an integer having a value of from 2 to about 200, specifically from 15 to about 100. In one embodiment, the polyether polyol comprises a mixture of one or more of dipropylene glycol, 1,4-butanediol, 2-methyl-1,3-propanediol, or the like, or combinations comprising at least one of the foregoing polyether polyols.

Other types of active hydrogen-containing materials that can be used are polymer polyol compositions obtained by polymerizing ethylenically unsaturated monomers in a polyol. Suitable monomers for producing such compositions include acrylonitrile, vinyl chloride, styrene, butadiene, vinylidene chloride, and other ethylenically unsaturated monomers. The polymer polyol compositions comprise greater than or equal to about 1, specifically greater than or equal to about 5, and more specifically greater than or equal to about 10 wt % monomer polymerized in the polyol where the weight percent is based on the total amount of polyol. In one embodiment, the polymer polyol compositions comprise less than or equal to about 70, specifically less than or equal to about 50, more specifically less than or equal to about 40 wt % monomer polymerized in the polyol. Such compositions are conveniently prepared by polymerizing the monomers in the selected polyol at a temperature of 40° C. to 150° C. in the presence of a free radical polymerization catalyst such as peroxides, persulfates, percarbonate, perborates, and azo compounds.

The active hydrogen-containing component can also contain polyhydroxyl-containing compounds, such as hydroxyl-terminated polyhydrocarbons, hydroxyl-terminated polyformals, fatty acid triglycerides, hydroxyl-terminated polyesters, hydroxymethyl-terminated perfluoromethylenes, hydroxyl-terminated polyalkylene ether glycols hydroxyl-terminated polyalkylenearylene ether glycols, and hydroxyl-terminated polyalkylene ether triols.

The polyols can have hydroxyl numbers that vary over a wide range. In general, the hydroxyl numbers of the polyols, including other cross-linking additives, if employed, are present in an amount of about 28 to about 1000, and higher, specifically about 100 to about 800. The hydroxyl number is defined as the number of milligrams of potassium hydroxide used for the complete neutralization of the hydrolysis product of the fully acetylated derivative prepared from 1 gram of polyol or mixtures of polyols with or without other crosslinking additives. The hydroxyl number can also be defined by the equation:

$$OH = \frac{56.1 \times 1000 \times f}{M.W.}$$

wherein OH is the hydroxyl number of the polyol, f is the average functionality, that is the average number of hydroxyl groups per molecule of polyol, and M.W. is the average molecular weight of the polyol.

Where used, a large number of suitable blowing agents or a mixture of blowing agents are suitable, particularly water. The water reacts with the isocyanate component to yield $CO_2$ gas, which provides the additional blowing necessary. In one embodiment when water is used as the blowing agent, the curing reaction is controlled by selectively employing catalysts. In one embodiment, compounds that decompose to liberate gases (e.g., azo compounds) can also be used.

Especially suitable blowing agents are physical blowing agents comprising hydrogen atom-containing components, which can be used alone or as mixtures with each other or with another type of blowing agent such as water or azo compounds. These blowing agents can be selected from a broad range of materials, including hydrocarbons, ethers, esters and partially halogenated hydrocarbons, ethers and esters, and the like. Suitable physical blowing agents have a boiling point between about −50° C. and about 100° C., and specifically between about −50° C. and about 50° C. Among the usable hydrogen-containing blowing agents are the HCFC's (halo chlorofluorocarbons) such as 1,1-dichloro-1-fluoroethane, 1,1-dichloro-2,2,2-trifluoro-ethane, monochlorodifluoromethane, and 1-chloro-1,1-difluoroethane; the HFCs (halo fluorocarbons) such as 1,1,1,3,3,3-hexafluoropropane, 2,2,4,4-tetrafluorobutane, 1,1,1,3,3,3-hexafluoro-2-methylpropane, 1,1,1,3,3-pentafluoropropane, 1,1,1,2,2-pentafluoropropane, 1,1,1,2,3-pentafluoropropane, 1,1,2,3,3-pentafluoropropane, 1,1,2,2,3-pentafluoropropane, 1,1,1,3,3,4-hexafluorobutane, 1,1,1,3,3-pentafluorobutane, 1,1,1,4,4,4-hexafluorobutane, 1,1,1,4,4-pentafluorobutane, 1,1,2,2,3,3-hexafluoropropane, 1,1,1,2,3,3-hexafluoropropane, 1,1-difluoroethane, 1,1,1,2-tetrafluoroethane, and pentafluoroethane; the HFE's (halo fluoroethers) such as methyl-1,1,1-trifluoroethylether and difluoromethyl-1,1,1-trifluoroethylether; and the hydrocarbons such as n-pentane, isopentane, and cyclopentane.

When used, the blowing agents including water generally comprise greater than or equal to 1, specifically greater than or equal to 5 weight percent (wt %) of the polyurethane liquid phase composition. In one embodiment, the blowing agent is present in an amount of less than or equal to about 30, specifically less than or equal to 20 wt % of the polyurethane liquid phase composition. When a blowing agent has a boiling point at or below ambient temperature, it is maintained under pressure until mixed with the other components.

Suitable catalysts used to catalyze the reaction of the isocyanate component with the active hydrogen-containing component include organic and inorganic acid salts of, and organometallic derivatives of bismuth, lead, tin, iron, antimony, uranium, cadmium, cobalt, thorium, aluminum, mercury, zinc, nickel, cerium, molybdenum, vanadium, copper, manganese, and zirconium, as well as phosphines and tertiary organic amines. Exemplary catalysts are dibutyltin dilaurate, dibutyltin diacetate, stannous octoate, lead octoate, cobalt naphthenate, triethylamine, triethylenediamine, N,N,N',N'-tetramethylethylenediamine, 1,1,3,3-tetramethylguanidine, N,N,N',N'-tetramethyl-1,3-butanediamine, N,N-dimethylethanolamine, N,N-diethylethanolamine, 1,3,5-tris(N,N-dimethylaminopropyl)-s-hexahydrotriazine, o- and p-(dimethylaminomethyl) phenols, 2,4,6-tris (dimethylaminomethyl) phenol, N,N-dimethylcyclohexylamine, pentamethyldiethylenetriamine, 1,4-diazobicyclo[2.2.2]octane, N-hydroxyl-alkyl quaternary ammonium carboxylates and tetramethylammonium formate, tetramethylammonium acetate, tetramethylammonium 2-ethylhexanoate and the like, as well as compositions comprising any one of the foregoing catalysts.

In one embodiment, the catalyst comprises a metal acetyl acetonate. Suitable metal acetyl acetonates include metal acetyl acetonates based on metals such as aluminum, barium, cadmium, calcium, cerium (III), chromium (III), cobalt (II), cobalt (III), copper (II), indium, iron (II), lanthanum, lead (II), manganese (II), manganese (III), neodymium, nickel (II), palladium (II), potassium, samarium, sodium, terbium, titanium, vanadium, yttrium, zinc and zirconium. An exemplary catalyst is bis(2,4-pentanedionate) nickel (II) (also known as nickel acetylacetonate or diacetylacetonate nickel) and derivatives thereof such as diacetonitrilediacetylacetonato nickel, diphenylnitrilediacetylacetonato nickel, bis(triphenylphosphine)diacetyl acetylacetonato nickel, and the like. Ferric acetylacetonate (FeAA) is also a suitable catalyst, due to its relative stability, good catalytic activity, and lack of toxicity. In one embodiment, the metal acetylacetonate is conveniently added by predissolution in a suitable solvent such as dipropylene glycol or other hydroxyl containing components which will then participate in the reaction and become part of the final product.

In one method of producing the polyurethane foams, the components for producing the foams, i.e., the isocyanate component, the active hydrogen-containing component, surfactant, catalyst, optional blowing agents, electrically conductive, flame retardant filler and other additives are first mixed together then subjected to mechanical foaming with air. Alternatively, the components can be added sequentially to the liquid phase during the mechanical foaming process. The gas phase of the foams is most specifically air because of its cost and ready availability. However, if desired, other gases can be used which are gaseous at ambient conditions and which are substantially inert or non-reactive with any component of the liquid phase. Such other gases include, for example, nitrogen, carbon dioxide, and fluorocarbons that are normally gaseous at ambient temperatures. The inert gas is incorporated into the liquid phase by mechanical foaming of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical foaming operation specifically is conducted at pressures not greater than 7 to 14 kg/cm$^2$ (100 to 200 pounds per square inch (psi)). Readily available mixing equipment can be used and no special equipment is generally necessary. The amount of inert gas beaten into the liquid phase is controlled by gas flow metering equipment to produce a froth of the desired density. The mechanical foaming is conducted over a period of a few seconds in an Oakes mixer, or about 3 to about 30 minutes in a Hobart mixer, or however long it takes to obtain the desired froth density in the mixing equipment employed. The froth as it emerges from the mechanical foaming operation is substantially chemically stable and is structurally stable but easily workable at ambient temperatures, e.g., about 10° C. to about 40° C.

After foaming, the reactive mixture is transferred at a controlled rate through a hose or other conduit to be deposited onto a first carrier. For convenience, this first carrier can be referred to as "bottom carrier," and is generally a moving support that can or cannot readily release the cured foam. A second carrier, also referred to herein as a "surface protective layer" or "top carrier" can be placed on top of the froth. The top carrier is also a moving support that also can or can not readily release from the cured foam. The top carrier can be applied almost simultaneously with the froth. Before applying the top carrier, the foam can be spread to a layer of desired thickness by a doctoring blade or other suitable spreading device. Alternatively, placement of the top carrier can be used to spread the foam and adjust the frothed layer to the desired thickness. In still another embodiment, a coater can be used after placement of the top carrier to adjust the height of the foam. After application of the top carrier, the frothed foam can be blown under the influence of a physical or chemical blowing agent. As described above, in a specific embodiment, a top carrier is not used.

The assembly of the carrier(s) and foam layer (after optional blowing) is delivered to a magnetic field and then optionally a heating zone for aligning the electrically conductive, magnetic particles and then curing the foam. In a specific embodiment, curing occurs after alignment of the electrically conductive, magnetic particles. Cure can be at ambient temperature (e.g., 23° C.) to avoid thermal expansion. Alternatively, the heating zone temperatures are maintained in a range effective for curing the foam, for example at about 70° C. to about 220° C., depending on the composition of the foam material. While differential temperatures can be established for purposes of forming an integral skin on an outside surface of the foam or for adding a relatively heavy layer to the foam, it is preferred to adjust the cure temperatures to avoid skin formation.

After the foam is heated and cured, it can then be passed to a cooling zone where it is cooled by any suitable cooling device such as fans. Where appropriate, the carrier(s) are removed and the foam can be taken up on a roll. Alternatively, the foam can be subjected to further processing, for example buffing or grinding as described above, or lamination (bonding using heat and pressure) to one or both of the carrier layers.

Other types of polymers can be used in the present manufacturing method. Preferably, such polymers can be foamed completely, or substantially completely prior to alignment of the electrically conductive, magnetic particles by the magnetic field. Where it is not possible or practicable to do so, such foams can be post-processed to remove any skin or additional foam material from the surface of the foam. Thus, silicone foams comprising a polysiloxane polymer and electrically conductive, magnetic particles can also be used.

In one embodiment, the silicone foams are produced as a result of the reaction between water and hydride groups in a polysiloxane polymer precursor composition with the consequent liberation of hydrogen gas foaming to select the cell size. This reaction is generally catalyzed by a noble metal, specifically a platinum catalyst. In one embodiment, the polysiloxane polymer has a viscosity of about 100 to 1,000,000 poise at 25° C. and has chain substituents selected from the group consisting of hydride, methyl, ethyl, propyl, vinyl, phenyl, and trifluoropropyl. The end groups on the polysiloxane polymer can be hydride, hydroxyl, vinyl, vinyl diorganosiloxy, alkoxy, acyloxy, allyl, oxime, aminoxy, isoprepenoxy, epoxy, mercapto groups, or other known, reactive end groups. Suitable silicone foams can also be produced by using several polysiloxane polymers, each having different molecular weights (e.g., bimodal or trimodal molecular weight distributions) as long as the viscosity of the combination lies within the above specified values. It is also possible to have several polysiloxane base polymers with different functional or reactive groups in order to produce the desired foam. In one embodiment, the polysiloxane polymer comprises about 0.2 moles of hydride (Si—H) groups per mole of water.

Depending upon the chemistry of the polysiloxane polymers used, a catalyst, generally platinum or a platinum-containing catalyst, can be used to catalyze the blowing and the curing reaction. The catalyst can be deposited onto an inert carrier, such as silica gel, alumina, or carbon black. In one embodiment, an unsupported catalyst selected from among chloroplatinic acid, its hexahydrate form, its alkali metal salts, and its complexes with organic derivatives is used. Exemplary catalysts are the reaction products of chloroplatinic acid with vinylpolysiloxanes such as 1,3-divinyltetramethyldisiloxane, which are treated or otherwise with an alkaline agent to partly or completely remove the chlorine atoms; the reaction products of chloroplatinic acid with alcohols, ethers, and aldehydes; and platinum chelates and platinous chloride complexes with phosphines, phosphine oxides, and with olefins such as ethylene, propylene, and styrene. It can also be desirable, depending upon the chemistry of the polysiloxane polymers to use other catalysts such as dibutyl tin dilaurate in lieu of platinum based catalysts.

Various platinum catalyst inhibitors can also be used to control the kinetics of the blowing and curing reactions in order to control the porosity and density of the silicone foams. Exemplary inhibitors include polymethylvinylsiloxane cyclic compounds and acetylenic alcohols. These inhibitors should not interfere with the foaming and curing in such a manner that destroys the foam.

Physical and/or chemical blowing agents are often used to produce silicone foams, but it is also possible to use mechanical foaming. The physical and chemical blowing agents listed above for polyurethanes can be used. Other exemplary chemical blowing agents include benzyl alcohol, methanol, ethanol, isopropyl alcohol, butanediol, and silanols. In one embodiment, a combination of methods of blowing is used to obtain foams having desirable characteristics. For example, a physical blowing agent such as a chlorofluorocarbon can be added as a secondary blowing agent to a reactive mixture wherein the primary mode of blowing is the hydrogen released as the result of the reaction between the hydroxyl substituents of water, alcohols, or other compounds, and hydride substituents on the polysiloxane.

In the production of silicone foams, the reactive components of the precursor composition are stored in two packages, one containing the platinum catalyst and the other the polysiloxane polymer containing hydride groups, which prevents premature reaction. It is possible to include the electrically conductive particles in either package. In another method of production, the polysiloxane polymer is introduced into an extruder along with the electrically conductive particles, water, physical, and/or chemical blowing agents if necessary, and other desirable additives. The platinum catalyst is then metered into the extruder to start the foaming and curing reaction and the mixture mechanically frothed. The use of physical blowing agents such as liquid carbon dioxide or supercritical carbon dioxide in conjunction with chemical blowing agents such as water can give rise to foam having much lower densities. In yet another method, the liquid silicone components are metered, mixed, mechanically frothed, and the froth dispensed into a device such a mold or a continuous coating line. The foaming thus can occur either in the mold or on the continuous coating line.

In one embodiment, the entire assembly comprising the platinum catalyst, the polysiloxane polymer containing hydride groups, electrically conductive particles, optional physical, and/or chemical blowing agents, optional platinum catalyst inhibitors, and other desired additives are placed in a magnetic field. Foaming can occur before or during exposure to the magnetic field.

Cross-linking is also known as gelling. Cross-linking can occur before foaming or after foaming. Cross-linking can also be performed before or after the particles are aligned by application of a magnetic field. In an embodiment, cross-linking is performed after application of the magnetic field. In an embodiment, the precursor composition is frothed, optionally blown, and then a magnetic field applied before cross-linking the prepolymer to gel the foam.

The electrically conductive silicone foams can have mechanical properties that are the same or substantially similar to those of the same silicone foams without the electrically conductive particles.

Alternatively, a soft, electrically conductive silicone composition can be formed by the reaction of a precursor composition comprising a liquid silicone composition comprising a polysiloxane having at least two alkenyl groups per molecule; a polysiloxane having at least two silicon-bonded hydrogen atoms in a quantity effective to cure the composition; a catalyst; and optionally a reactive or non-reactive polysiloxane fluid having a viscosity of about 100 to about 1000 centipoise. Suitable reactive silicone compositions are low durometer, 1:1 liquid silicone rubber (LSR) or liquid injection molded (LIM) compositions. Because of their low inherent viscosity, the use of the low durometer LSR or LIM facilitates the addition of higher filler quantities, and results in formation of a soft foam.

The reactive or non-reactive polysiloxane fluid allows higher quantities of filler to be incorporated into the cured silicone composition, thus lowering the obtained volume and surface resistivity values. In one embodiment, the polysiloxane fluid remains within the cured silicone and is not extracted or removed. The reactive silicone fluid thus becomes part of the polymer matrix, leading to low outgassing and little or no migration to the surface during use. In one embodiment, the boiling point of the non-reactive silicone fluid is high enough such that when it is dispersed in the polymer matrix, it does not evaporate during or after cure, and does not migrate to the surface or outgas.

In one embodiment, LSR or LIM systems are provided as two-part formulations suitable for mixing in ratios of about 1:1 by volume. The "A" part of the formulation comprises one or more polysiloxanes having two or more alkenyl groups and has an extrusion rate of less than about 500 g/minute. Suitable alkenyl groups are exemplified by vinyl, allyl, butenyl, pentenyl, hexenyl, and heptenyl, with vinyl being particularly suitable. The alkenyl group can be bonded at the molecular chain terminals, in pendant positions on the molecular chain, or both. Other silicon-bonded organic groups in the polysiloxane having two or more alkenyl groups are exemplified by substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The alkenyl-containing polysiloxane can have straight chain, partially branched straight chain, branched-chain, or network molecule structure, or can be a mixture of two or more selections from polysiloxanes with the exemplified molecular structures. The alkenyl-containing polysiloxane is exemplified by trimethylsiloxy-endblocked dimethylsiloxane-methylvinylsiloxane copolymers, trimethylsiloxy-endblocked methylvinylsiloxane-methylphenylsiloxane copolymers, trimethylsiloxy-end blocked dimethylsiloxane-methylvinylsiloxane-methylphenylsiloxane copolymers, dimethylvinylsiloxy-endblocked dimethylpolysiloxanes, dimethylvinylsiloxy-endblocked methylvinylpolysiloxanes, dimethylvinylsiloxy-endblocked methylvinylphenylsiloxanes, dimethylvinylsiloxy-endblocked dimethylvinylsiloxane-methylvinylsiloxane copolymers, dimethylvinylsiloxy-endblocked dimethylsiloxane-methylphenylsiloxane copolymers, dimethylvinylsiloxy-endblocked dimethylsiloxane-diphenylsiloxane copolymers, polysiloxane comprising $R_3SiO_{1/2}$ and $SiO_{4/2}$ units, polysiloxane comprising $RSiO_{3/2}$ units, polysiloxane comprising the $R_2SiO_{2/2}$ and $RSiO_{3/2}$ units, polysiloxane comprising the $R_2SiO_{2/2}$, $RSiO_{3/2}$ and $SiO_{4/2}$ units, and a mixture of two or more of the preceding polysiloxanes. R represents substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl, with the proviso that at least 2 of the R groups per molecule are alkenyl.

The "B" component of the LSR or LIM system comprises one or more polysiloxanes that contain at least two silicon-bonded hydrogen atoms per molecule and has an extrusion rate of less than about 500 g/minute. The hydrogen can be bonded at the molecular chain terminals, in pendant positions on the molecular chain, or both. Other silicon-bonded groups are organic groups exemplified by non-alkenyl, substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups.

The hydrogen-containing polysiloxane component can have straight-chain, partially branched straight-chain, branched-chain, cyclic, network molecular structure, or can be a mixture of two or more selections from polysiloxanes with the exemplified molecular structures. The hydrogen-containing polysiloxane is exemplified by trimethylsiloxy-endblocked methylhydrogenpolysiloxanes, trimethylsiloxy-endblocked dimethylsiloxane-methylhydrogensiloxane copolymers, trimethylsiloxy-endblocked methylhydrogensiloxane-methylphenylsiloxane copolymers, trimethylsiloxy-endblocked dimethylsiloxane-methylhydrogensiloxane-methylphenylsiloxane copolymers, dimethylhydrogensiloxy-endblocked dimethylpolysiloxanes, dimethylhydrogensiloxy-endblocked methylhydrogenpolysiloxanes, dimethylhydrogensiloxy-endblocked dimethylsiloxanes-methylhydrogensiloxane copolymers, dimethylhydrogensiloxy-endblocked dimethylsiloxane-methylphenylsiloxane copolymers, and dimethylhydrogensiloxy-endblocked methylphenylpolysiloxanes.

The hydrogen-containing polysiloxane component is added in an amount sufficient to cure the composition, specifically in a quantity of about 0.5 to about 10 silicon-bonded hydrogen atoms per alkenyl group in the alkenyl-containing polysiloxane.

The silicone composition further comprises, generally as part of Component "A," a catalyst such as platinum to accelerate the cure. Platinum and platinum compounds known as hydrosilylation-reaction catalysts can be used, for example platinum black, platinum-on-alumina powder, platinum-on-silica powder, platinum-on-carbon powder, chloroplatinic acid, alcohol solutions of chloroplatinic acid platinum-olefin complexes, platinum-alkenylsiloxane complexes and the catalysts afforded by the microparticulation of the dispersion of a platinum addition-reaction catalyst, as described above, in a thermoplastic resin such as methyl methacrylate, polycarbonate, polystyrene, silicone, and the like. Mixtures of catalysts can also be used. A quantity of catalyst effective to cure the present composition is generally from 0.1 to 1,000 parts per million (by weight) of platinum metal based on the combined amounts of alkenyl and hydrogen components.

The composition optionally further comprises one or more polysiloxane fluids having a viscosity of less than or equal to about 1000 centipoise, specifically less than or equal to about 750 centipoise, more specifically less than or equal to about 600 centipoise, and most specifically less than or equal to about 500 centipoise. The polysiloxane fluids can also have a viscosity of greater than or equal to about 100 centipoises. The polysiloxane fluid component is added for the purpose of decreasing the viscosity of the composition, thereby allowing at least one of increased filler loading, enhanced filler wetting, and enhanced filler distribution, and resulting in cured compositions having lower resistance and resistivity values. Use of the polysiloxane fluid component can also reduce the dependence of the resistance value on temperature, and/or reduce the timewise variations in the resistance and resistivity values. Use of the polysiloxane fluid component obviates the need for an extra step during processing to remove the fluid, as well as possible outgassing and migration of diluent during use. The polysiloxane fluid should not inhibit the curing reaction, that is, the addition reaction, of the composition, but it may or may not participate in the curing reaction.

The non-reactive polysiloxane fluid has a boiling point of greater than about 500° F. (260° C.), and can be branched or straight-chained. The non-reactive polysiloxane fluid comprises silicon-bonded non-alkenyl organic groups exemplified by substituted and unsubstituted monovalent hydrocarbon groups, for example, alkyl groups such as methyl, ethyl, propyl, butyl, pentyl, and hexyl; aryl groups such as phenyl, tolyl, and xylyl; aralkyl groups such as benzyl and phenethyl; and halogenated alkyl groups such as 3-chloropropyl and 3,3,3-trifluoropropyl. Exemplary substituents are methyl and phenyl groups. Thus, the non-reactive polysiloxane fluid can comprise $R_3SiO_{1/2}$ and $SiO_{4/2}$ units, $RSiO_{3/2}$ units, $R_2SiO_{2/2}$ and $RSiO_{3/2}$ units, or $R_2SiO_{2/2}$, $RSiO_{3/2}$ and $SiO_{4/2}$ units, wherein R represents substituted and unsubstituted monovalent hydrocarbon groups selected from the group consisting of alkyl, methyl, ethyl, propyl, butyl, pentyl, hexyl, aryl, phenyl, tolyl, xylyl, aralkyl, benzyl, phenethyl, halogenated alkyl, 3-chloropropyl, and 3,3,3-trifluoropropyl. Because the non-reactive polysiloxane is a fluid and has a significantly higher boiling point (greater than about 230° C. (500° F.)), it allows the incorporation of higher quantities of filler, but does not migrate or outgas. Exemplary non-reactive polysiloxane fluids include DC 200 from Dow Corning Corporation.

Reactive polysiloxane fluids co-cure with the alkenyl-containing polysiloxane and the polysiloxane having at least two silicon-bonded hydrogen atoms, and therefore can themselves contain alkenyl groups or silicon-bonded hydrogen groups. Such compounds can have the same structures as described above in connection with the alkenyl-containing polysiloxane and the polysiloxane having at least two silicon-bonded hydrogen atoms, but in addition have a viscosity of less than or equal to about 1000 centipoise (cps), specifically less than or equal to about 750 cps, more specifically less than or equal to about 600 cps, and most specifically less than or equal to about 500 cps. In one embodiment, the reactive polysiloxane fluids have a boiling point greater than the curing temperature of the addition cure reaction.

The polysiloxane fluid component is present in amount effective to allow the addition, incorporation, and wetting of higher quantities of conductive filler and/or to facilitate incorporation of the electrically conductive particles, for example to facilitate detangling and/or dispersion. In one embodiment, the polysiloxane fluid component is added to the composition in an amount of about 5 to about 50 weight parts per 100 weight parts of the combined amount of the polysiloxane having at least two alkenyl groups per molecule, the polysiloxane having at least two silicon-bonded hydrogen atoms in a quantity effective to cure the composition, and the catalyst. The amount of the polysiloxane fluid component is specifically greater than or equal to about 5, more specifically greater than or equal to about 7.5, and even more specifically greater than or equal to about 10 weight parts. Also desired is a polysiloxane fluid component of less than or equal to about 50 weight parts, more specifically less than or equal to about 25 weight parts, and more specifically less than or equal to about 20 weight parts of the combined amount of the polysiloxane having at least two alkenyl groups per molecule, the polysiloxane having at least two silicon-bonded hydrogen atoms in a quantity effective to cure the composition, and the catalyst.

The silicone foams can further optionally comprise a curable silicone gel formulation. Silicone gels are lightly cross-linked fluids or under-cured elastomers. They are unique in that they range from very soft and tacky to moderately soft and only slightly sticky to the touch. Use of a gel formulation decreases the viscosity of the composition, thereby allowing at least one of an increased filler loading, enhanced filler wetting, and/or enhanced filler distribution, thereby resulting in cured compositions having lower resistance and resistivity values and increased softness. Suitable gel formulations can be either two-part curable formulations or one-part formulations. The components of the two-part curable gel formulations is similar to that described above for LSR systems (i.e., an organopolysiloxane having at least two alkenyl groups per molecule and an organopolysiloxane having at least two silicon-bonded hydrogen atoms per molecule). The main difference lies in the fact that no filler is present, and that the molar ratio of the silicon-bonded hydrogen groups (Si—H) groups to the alkenyl groups is usually less than one, and can be varied to create a "under-cross linked" polymer with the looseness and softness of a cured gel. Specifically, the molar ratio of silicone-bonded hydrogen atoms to alkenyl groups is less than or equal to about 1.0, specifically less than or equal to about 0.75, more specifically less than or equal to about 0.6, and most specifically less than or equal to about 0.1. An example of a suitable two-part silicone gel formulation is SYLGARD® 527 gel commercially available from the Dow Corning Corporation.

The silicone foams can be cast and processed using only a bottom carrier, or both a bottom carrier and a top carrier as described above.

As is known, the foaming and curing (gelling) steps in two-part silicone foams often overlaps, or occurs simultaneously. If curing advances too far before particle alignment is complete, the foam composites are less conductive. Delaying cure, on the other hand, can lead to foaming continuing after particle alignment. In this case, the layer removal technique can be used to improve the electrical conductivity of the foam composite. Alternatively, the foaming/curing reaction can be controlled to better separate the foaming and curing steps. Use of a latent catalyst can delay the cure reaction, and/or use of catalyst combinations. For example, a combination of different catalysts can be used, such as a platinum catalyst to promote foaming, and a second, latent catalyst system to promote curing after foaming. Addition of certain chemical regulators could be used to modify the foaming reaction. Alternatively, some silicone gel formulations or reinforced silicone formulations can be mechanically frothed or physically blown (using, e.g., volatile blowing agents such as methanol, isopropanol, or benzyl alcohol), and then cured. It can be advantageous with these formulations to use fibrous fillers (e.g., carbon fibers) to increase the foam viscosity, thereby increasing the amount of air that can be incorporated into the precursor silicone formulation, as well as maintaining the froth after casting.

Thus, in one embodiment, a method of manufacturing a silicone foam comprises: foaming a mixture comprising a polysiloxane polymer having hydride substituents, a catalyst, and a filler composition comprising a plurality of magnetic, electrically conductive particles; forming an article, e.g., a layer having a first surface and an opposite second surface; aligning the magnetic, electrically conductive particles into mutually isolated chains that essentially continuously span the foam between the first surface and the second opposite surface of the foam; and curing the foam to produce a silicone foam composite having a volume resistivity of about $10^{-3}$ ohm-cm to about $10^3$ ohm-cm at a pressure of 60 pounds per square inch.

Of course, it is also possible to use a bottom carrier and a top carrier as described above, followed by treating to remove the outer layer of one or both surfaces of the silicone layer.

Use of magnetically aligned, electrically conductive particles allows the manufacture of polymer foam composites that have excellent electrical conductivity using lower levels of electrically conductive filler. Use of lower levels results in the foams having improved physical properties, particularly compression set and/or softness. These characteristics permit the polymer foams to be used as a variety of articles such as gasketing materials, electrical grounding pads, battery contact conductive spring elements and the like, particularly where electromagnetic and/or radio frequency shielding or electrostatic dissipative properties are desired. The materials can be used where sealing, shock absorption, and/or cushioning, together with electrical conductivity is desired. The foam layers could also be used to provide thermal conductivity, if the electrically conductive fillers are also thermally conductive, or if both electrically and thermally conductive fillers are present. In one embodiment, thermally conductive fillers (instead of electrically conductive fillers could be used, to provide a layer with thermal conductivity.

The electrically conductive polymer foam composites could also be used with or without an electrically conductive layer (e.g., a copper foil) and a patterned, non-electrically conductive adhesive. As is known, non-electrically conductive adhesives are desirable due to their significantly lower cost compared to conductive adhesives. The foregoing article configuration allows an electrical connection between the foam layer and the conductive layer, together with use of a less expensive adhesive. In another embodiment, the formulation of the cured polymer foam is adjusted by known means to provide adhesive properties to the polymer foam. A conductive foam adhesive can be achieved.

Polymer foams prepared as described herein have improved cell size distribution, as well as improved conductivity and/or physical properties, including compressibility. Polymer foams with improved conductivity and/or physical properties provide improved shielding capability and improved sealing properties. Polymer foams prepared using mechanical foaming in particular have improved cell size distribution, as well as improved conductivity and/or physical properties, including compressibility. In addition, mechanical foaming enables the manufacture of polymer foams at lower cost.

In an advantageous feature, the electrically conductive polymer foam composites (in particular the polyurethane and silicone foam composites) have mechanical properties similar to those of the same foam without the electrically conductive, magnetic filler. If auxiliary blowing agents are employed, the polymer foam composites can have a bulk density as low as about 1 pound per cubic foot (pcf, 16 kilogram per cubic meter (kcm)). The densities of the polymer foam composites are affected by the specific gravity of the filler compositions. However, in general, the polymer foam composites have a density of about 1 to about 150 pcf (16 to 2402 kcm, specifically about 5 to about 125 pcf (80 to 2002 kcm), more specifically about 10 to about 100 pcf (160 to 1601 kcm), and still more specifically about 20 to about 80 pcf (to 1281 kcm).

Use of the magnetically aligned, electrically conductive particles enables the production of electrically conductive polymer foam composites having a volume resistivity of about $10^{-3}$ ohm-cm to about $10^3$ ohm-cm, measured at 60 pounds per square inch (psi, 42 kilogram/square centimeter ($kg/cm^2$)) pressure. Within this range, the volume resistivity can be about $10^{-3}$ to about $10^2$ ohm-cm, more specifically about $10^{-2}$ to 10 ohm-cm, and most specifically about $10^{-2}$ to about 1 ohm-cm, each measured at 60 psi (42 $k/cm^2$). As shown in the Examples below, specific conditions are required to obtain polymer foam composites having volume resistivities in the range of about $10^{-3}$ ohm-cm to about $10^3$ ohm-cm (cf. Comparative Examples). However, such resistivities can be obtained using the methods disclosed herein. It has been found by the inventors hereof that it is more difficult to obtain polymer foam composites having volume resistivities of less than about 100 ohm-cm at 60 psi, i.e., in the range of about $10^{-2}$ ohm-cm to about $10^2$ ohm-cm at 60 psi, and that obtaining such values requires adjustment of the type of foam and how it is processed (e.g., mechanically foamed), type of electrically conductive, magnetic filler (e.g. nickel-coated stainless steel), shape of the filler particles (e.g., spherical or rod-like), and amount of the filler particles. Obtaining a volume resistivity of 100 ohm-cm or less at lower pressures (e.g., 40 psi or 20 psi is particularly difficult. Nonetheless, by following the teachings herein, a polymer foam composite having a volume resistivity of about $10^{-2}$ ohm-cm to about $10^2$ ohm-cm at 20 psi can be obtained.

The polymer foam composites can provide electromagnetic shielding in an amount of greater than or equal to about 50 decibels (dB), specifically greater than or equal to about 70 dB, even more specifically greater than or equal to about 80 dB. One method of measuring electromagnetic shielding is set forth in MIL-G-83528B.

In a particular embodiment, the volume resistivity of the polymer foam composite is less than or equal to about 1 ohm-cm, and the electromagnetic shielding is greater than or equal to about 80 dB.

The foams have excellent compressibility. Compressibility can be determined by measuring the percent strain at a given pressure. The polymer foam composites have percent strain at 100 psi (7 kg/cm²) of greater than 10%, specifically greater than 20%, more specifically greater than 40%, even more specifically greater than 50%.

The polymer foam composites can have a 25% compressive force deflection (CFD) of 0.007 to 7 kg/cm² (0.1 to 100 psi) specifically about 0.07 to about 2.8 kg/cm² (about 1 to about 40 psi), measured in accordance with ASTM 1056.

The polymer foam composites can have an elongation to break of greater than or equal to about 20%, specifically greater than about 100%.

The polymer foam composites can have a compression set (50%) of less than about 20%, specifically about 10%.

In specific embodiment, the polymer foam composite, in particular a polyurethane foam composite, has a percent strain at 100 psi (7 kg/cm²) of greater than 20%, an elongation to break of greater than or equal to about 20%; a compression set (50%) of less than or equal to about 30%, and a density of about 1 to about 60 pcf.

In another specific embodiment, the polymer foam composite, in particular a polyurethane foam composite, has a percent strain at 100 psi (7 kg/cm²) of greater than 40%, an elongation to break of greater than or equal to about 100%; a compression set (50%) of less than or equal to about 30%, and a density of about 10 to about 100 pcf.

Shaped, formed, or molded articles comprising the above described electrically conductive foam composites are also provided. The foams can be formed into useful articles by a variety of means for example, cutting, thermoforming, and the like. Possible applications include, for example, computer and business machines, monitors, handheld electronic devices, cell phones, electrical connectors, and components of lighting fixtures, ornaments, home appliances, and the like. In addition, the foams can be used for such application as EMI/RFI shielding and in other devices such as cell phones.

The following examples, which are meant to be exemplary, not limiting, illustrate compositions and methods of manufacturing of some of the various embodiments of the electrically conductive polymer foam composites described herein.

EXAMPLES

Examples 1-3

The following test was used to determine conductivity in Examples 1-3, wherein the foams that have a volume resistivity of greater than $10^3$ ohm-cm are comparative. As is known, particular values for volume resistivity and electrostatic shielding will depend on the particular test methods and conditions. For example, it is known that volume resistivity and shielding effectiveness can vary with the pressure placed on the sample during the test. Useful electrical equipment and test fixtures to measure volume resistivity in the sample below are as follows. The fixture is a custom fabricated press with gold plated, 2.5 cm×2.5 cm (1 inch×1 inch) square, and electrical contacts. The fixture is equipped with a digital force gauge that allows the operator to control and make adjustments to the force that is applied to the surface of the sample. The power supply is capable of supplying 0 to 2 amps to the sample surface. The voltage drop and ohms across the sample are measured using a HP 34420A Nano Volt/Micro Ohmmeter. The electronic components of the fixture are allowed to warm up and, in the case of the HP 34420 A, the internal calibration checks are done. The samples are allowed to equilibrate, for a period of 24 hours, to the conditions of the test environment. Suitable test environment is 50% Relative Humidity (% RH) with a room temperature of 23° C. (70° F.). The sample to be tested is placed between the platens of the test fixture and a load is applied to the surface. The applied load is dependent on the type of sample to be tested, soft foams are tested using small loads while solids are tested using a load range from about 63,279 to about 210,930 kilogram per square meter (90 to 300 pounds per square inch). Once the load has been applied, the current is applied to the sample and the voltage drop through the sample thickness is measured. A suitable test would include measurements at 4 different amp settings, 0.5, 1.0, 1.6, and 2.0 amps. For a conductive composite, the resulting calculated volume resistivity for all four of the amp settings will be similar. The calculation for the volume resistivity is as follows:

Volume resistivity(ohm-cm)=$(E/I)*(A/T)$ wherein E=voltage drop (V), I=current (amps), A=area (cm²), and T=thickness (cm).

Example 1

An evaluation of nickel and nickel-coated ceramic microspheres as conductive fillers in a silicone foam was performed. Silicones (Dow Corning Silicone 8137), the filler microspheres, and silicone cure inhibitor (1-octyn-3-ol from Aldrich Chemical Co.) were mixed in a Flaktek speed mixer, cast on a PET film with a controlled thickness, and were placed in an oven exposed to an adjustable magnetic field. In general, the chemically blown and cured foams had a thickness of 70 to 80 mils (1778 to 2032 micrometers).

The results in Table 1 show that even under a magnetic field as strong as 1200 Gauss, no conductivity was observed in the thick layers of the cured foam.

TABLE 1

| Run No. | 1 | 2 | 3 | 4 | 5 | 6 | 7 |
|---|---|---|---|---|---|---|---|
| Magnetic field, Gauss | 250 | 250 | 1000 | 1000 | 1200 | 1200 | 1200 |
| Casting thickness, mil | 10 | 20 | 20 | 20 | 20 | 20 | 20 |
| Oven temperature, ° C. | 23 | 23 | 23 | 23 | 23 | 23 | 23 |
| Oven residence time, min | 5 | 5 | 5 | 5 | 10 | 10 | 10 |
| Top carrier | no | no | no | no | no | no | no |
| Si formulation A/B, grams | 33/3.3 | 33/3.3 | 33/3.3 | 33/3.3 | 33/3.3 | 33/3.3 | 33/3.3 |
| Inhibitor, drops (about 40 mg) | 5 | 4 | 4 | 4 | 3 | — | 2 |
| Filler sphere size, micrometers | 45-75* | 45-75* | <35** | <35** | <100** | <100** | <100** |
| Wt. % Ni in filler | 100 | 100 | 27 | 27 | 10 | 10 | 10 |
| Filler loading, wt. % | 10 | 20 | 10 | 20 | 20 | 20 | 20 |
| Conductivity*** | no | no | no | no | no | no | no |

*100% nickel microspheres
**Ni-coated ceramic microspheres
***"No" = Volume resistivity was greater than 1,000 ohm-cm at 60 psi

Example 2

Table 2 shows the results of additional runs using 100% nickel microspheres. Formulations were cast at a thickness of 18 to 40 mil (457 to 1016 micrometers) to prepare foam samples.

TABLE 2

| Run No. | 1 | 2 | 3 | 4 | 5 | 6 | 7 | 8 | 9 | 10 | 11 | 12 | 13 |
|---|---|---|---|---|---|---|---|---|---|---|---|---|---|
| Magnetic field, Gauss | 1000 | 1000 | 1000 | 1000 | 1000 | 1000 | 1000 | 1000 | 1000 | 1000 | 1000 | 1000 | 1000 |
| Casting thickness, mil | 20 | 20 | 40 | 40 | 40 | 27 | 18 | 18 | 18 | 18 | 18 | 18 | 27 |
| Oven temp, ° C. | 60 | 60 | 60 | 60 | 60 | 60 | 60 | 60 | 60 | 60 | 60 | 60 | 60 |
| Oven residence time, min | 10 | 10 | 5 | 5 | 5 | 5 | 5 | 5 | 5 | 5 | 5 | 5 | 5 |
| With top carrier | no | no | no | yes | yes | yes | yes | yes | yes | yes | yes | yes | yes |
| Si formulation, A/B, grams | 33/3.3 | 33/3.3 | 33/3.3 | 33/3.3 | 33/3.3 | 33/3.3 | 33/3.3 | 33/3.3 | 50/5 | 50/5 | 33/3.3 | 33/3.3 | 33/3.3 |
| Inhibitor, drops (about 40 mg) | 4 | 4 | 4 | 4 | 4 | 4 | 4 | 4 | 6 | 6 | 4 | 4 | 4 |
| Filler sphere size, micrometer | 45-75 | 45-75 | 45-75 | 45-75 | 45-75 | 45-75 | 45-75 | 45-75 | 45-75 | 45-75 | 32-45 | 32-45 | 32-45 |
| Filler loading, grams | 18 | 24 | 30 | 30 | 30 | 30 | 33 | 50 | 55 | 50 | 50 | 60 | 60 |
| Nickel column formation | yes | yes | yes | yes | yes | yes | yes | yes | yes | yes | yes | yes | yes |
| Thickness, mil | 21 | 23 | 55 | 103 | 125 | 98 | 49 | 46 | 46 | 47 | 47 | 41 | 72 |
| Density, PCF | 38.4 | 37.3 | 30.2 | 31 | 26.1 | 22 | 24.7 | 26.9 | 28.3 | 30.8 | 30.8 | 38.1 | 39.9 |
| Conductivity* | no | no | no | no | no | no | no | no | no | no | no | no | no |
| Foam quality | poor | poor | poor | good | good | good | good | good | good | good | good | good | good |

*"No" = Volume resistivity greater than 1,000 ohm-cm at 60 psi

In the runs shown in Table 2, filler column formation was observed; however, the foams were not conductive. Runs 1-3 were cast without a top carrier, which resulted in foams of poorer quality. Analysis of runs 4-13 showed that the cured foams were 40 to 120 mils (1016 to 3038 micrometers) thick, and had two or more cells spanning the thickness of the foam (z-direction).

Example 3

Thinner foams were prepared using 100% Ni spheres or silver-coated nickel spheres, both with and without a top carrier as indicated. The premix was cooled in a refrigerator. The results are shown in Table 3.

TABLE 3

| Run No. | 1a | 1b | 2a | 2b | 4a | 4b |
|---|---|---|---|---|---|---|
| Magnetic field, Gauss | 500 | 500 | 250 | 250 | 250 | 250 |
| Casting thickness, mil | 5 | 5 | 5 | 5 | 10 | 10 |
| Oven temp, ° C. | 55 | 55 | 55 | 55 | 50 | 50 |
| Oven residence time, min | 5 | 5 | 5 | 5 | 5 | 5 |
| With top carrier | no | yes | no | yes | no | yes |
| Substrate | PET | PET | PET | PET | PET | PET |
| Si formulation A/B, grams | 33/3.3 | 33/3.3 | 33/3.3 | 33/3.3 | 33/3.3 | 33/3.3 |
| Inhibitor, drops (about 40 mg) | 4 | 4 | 4 | 4 | 4 | 4 |
| Filler sphere size, micrometer | 45-75 | 45-75 | 45-75 | 45-75 | 75-90* | 75-90* |
| Filler loading, grams | 48 | 48 | 48 | 48 | 48 | 48 |
| Filler column formation | yes | Yes | yes | yes | yes | yes |
| Thickness, mil | 8 | 13 | 6 | 13.5 | 6 | 14 |
| Density, PCF | 72.3 | 35.4 | 97.7 | 34.2 | 93.5 | 35 |
| Conductivity** | no | yes | no | yes | yes | yes |

*Silver-coated nickel spheres
n/t: not tested
**"No = volume resistivity greater than 1,000 ohm-cm at 60 psi; "yes" = volume resistivity less than 1,000 ohm-cm at 60 psi It can be seen from the results in Table 3 that use of a top carrier, combined with manufacture of a thinner foam, can lead to improved conductivities.

Example 4-5

In Examples 4-5, the following tests were used.
To measure volume resistivity, the fixture used was a Stable Micro Systems (SMS) TA HD Plus Texture Analyser. A 50-Kg loadcell was used to record the resistance of material during a compression test. The samples (½-inch diameter) were equilibrated for a period of 24 hours to the conditions of the test environment, here 50% relative humidity (% RH) with a room temperature of 23° C. (70° F.). The ohm-meter setting (2 or 20 ohms) was selected, and the ohm-meter was calibrated if there was a change in setting. The frame deflection was calibrated, and a pre-test was run at a speed of 0.5 mm/sec until a preload of 10 g force is reached. The test speed was 0.01 mm/sec until a target force of 9.00 Kg was reached. The resistance and compression load were recorded as the strain increases. The volume resistivity was calculated based on the resistance measurement and the sample dimensions. The calculation for the volume resistivity is as above.

Modulus as reflected by compression force deflection (CFD) was determined on an Instron using 5×5 centimeter die-cut samples stacked to a minimum of 0.6 centimeters (0.250 inches), usually about 0.9 centimeters (0.375 inches), using two stacks per lot or run, and a 9090 kg (20,000 pound) cell mounted in the bottom of the Instron. CFD was measured by calculating the force in pounds per square inch (psi) required to compress the sample to 25% of the original thickness in accordance with ASTM D1056.

Tensile strength and elongation were measured using an Instron fitted with a 20 kilogram (50-pound) load cell and using 4.5-9.0 kilogram range depending on thickness and density. Tensile strength is calculated as the amount of force in kilogram per square centimeter ($kg/cm^2$) at the break divided by the sample thickness and multiplied by two. Elongation is reported as percent extension.

Example 4

Polyurethane composite foams were prepared by the following procedure.

Large master mixes were weighed out with all components except the isocyanate and the electrically conductive, magnetic particles. The components were mixed under low speed with a high shear-mixing element for a period of 1 minute. Care was taken to ensure that no air entrainment occurred. Mixing was performed with a lab-top air mixer. Smaller batches were taken from this master mix and combined with the desired quantity of electrically conductive, magnetic particles to equal 100 grams total. These were contained in 250 mL beakers. Depending upon the target density, the smaller batches were mixed and the correct amount of isocyanate (approx. 15 mL) was added.

For density between 50 and 60 pcf, a shearing mixing element was used. The polyol blend and filler were mixed for a period of 1 minute prior to the addition of isocyanate and 1.5 minutes after isocyanate addition. Mix speed was slow.

For density of about 40 pcf the 'whisk' frothing mixing element was used. The polyol blend was mixed for 3 minutes then the isocyanate was added and mixing continued for an additional 1.5 minutes. Mix speed was slow to moderate.

For densities lower than 40 pcf, the 'whisk' mixing element was also used. The polyol blend was mixed for 5 minutes then the isocyanate was added, and mixing continued for an additional 1.5 minutes. Mix speed was high.

Casting was performed at a hand pull station with a roll-over-roll nip capable of maintaining accurate gaps. Gap setting was set based on carrier thickness and target density. In general, a gap setting of 0.052 inches plus the carrier thickness yields a final thickness of 0.040 inches at 40 pcf. Paper carriers were dried in an oven at 100° C. for no shorter than 15 minutes prior to casting. Immediately after adding the isocyanate and mixing, the precursor blend was poured on the carrier as the carrier was pulled through the nip. Pull speed was slow and consistent. If the polyol blend was poured and then pulled a crescent shaped section appeared at the beginning of the resultant sample.

Platens were set to a temperature of 320° F. The magnet setting was a voltage of 3, amperage of 6, which results in a gauss of about 250. Trials were run at 4, 8 and 24 amps. A setting of 6 amps appeared to result in the electrically conductive, magnetic spheres forming columns just high enough to pierce the surface of the foam when no top carrier was present. A setting of 24 amps produced a particle stack that was about ⅜-inch tall, significantly taller than the thickness of the polymer foam. Particle stacks up to one-inch high have been produced.

Buffing, when used, was on a sample size of 2×2 inches. The sample was placed on a firm, flat surface sanding block, using a 1×2×0.250 inch magnet. Samples were buffed using a Beuler Handi-Met 2 roll sander with a continuous flow of water, ensuring that the sandpaper surface was completely wet, using the following protocol: 6-8 passes on 320 grit sandpaper; then 6-8 passes on 400 grit sandpaper; followed by 8-10 passes on 600 grit paper. The sample was patted dry using a paper towel, samples were cut for testing, and then dried at 70° C. for 15 minutes.

Polyurethane foam composites were prepared using nickel-coated stainless steel spheres having the range of diameters shown in Table 2. The foam composites were formed without a top carrier unless noted. Other treatment conditions and the results of the Runs of Example 4 are shown in Tables 4a and 4b.

TABLE 4a

| Run | Treatment | Filler size, um um | Magnet Gauss | Loading in solid wt % | Loading in solid vol % | Avg thickness mm | VR (ohm-cm) at PSI (avg of five samples each) | | | | Strain at 100 psi % |
|---|---|---|---|---|---|---|---|---|---|---|---|
| | | | | | | | 10 psi | 20 psi | 40 psi | 60 psi | |
| 1a | No treatment | 180-212 | 205 | 49.2 | 12.8 | 0.92 | 24.15 | 23.92 | 12.29 | 9.44 | 32 |
| 1b | 1 side buffed** (a) | 180-212 | 205 | 49.2 | 12.8 | 1.26 | 27.20 | 91.46 | 20.43 | 13.92 | 32 |
| 1c | 2 sides buffed | 180-212 | 205 | 49.2 | 12.8 | 0.621 | 44.09 | 13.56 | 11.35 | 3.20 | 27 |
| 2 | No treatment | 180-212 | 205 | 49.2 | 12.8 | 0.83 | >100 | >100 | 64.55 | 62.73 | 21 |
| 3 | No treatment | 180-212 | 290 | 49.2 | 12.8 | 1.02 | >100 | >100 | 58.39 | 51.87 | 28 |
| 4 | No treatment | 212-250 | 205 | 49.2 | 12.8 | 0.67 | 7.43 | 5.47 | 1.57 | 1.01 | 26 |
| 5a | No treatment | 212-250 | 290 | 49.2 | 12.8 | 1.01 | >100 | 50.61 | 44.47 | 4.08 | 29 |
| 5b | 1 side buffed** | 212-250 | 290 | 49.2 | 12.8 | 0.90 | 1.67 | 0.57 | 0.26 | 0.18 | 29 |
| 5c | 1 side buffed** w/adhesive*** | 212-250 | 290 | 49.2 | 12.8 | 0.96 | 11.51 | 1.64 | 0.41 | 0.24 | 28 |
| 5d | Cast onto Cu foil | 212-250 | 290 | 49.2 | 12.8 | 1.74 | 7.52 | 9.57 | 5.28 | 2.70 | 38 |
| 6 | No treatment | 180-212 | 205 | 55.0 | 16.2 | 1.10 | >100 | >100 | >100 | >100 | 27 |
| 7a | No treatment (b) | 212-250 | 205 | 55.0 | 16.2 | 1.10 | 53.04 | 6.88 | 6.75 | 3.64 | 32 |
| 7b | No treatment (c) | 212-250 | 205 | 55.0 | 16.2 | 1.35 | 33.98 | 23.21 | 32.03 | 81.20 | 43 |
| 8a | No treatment | 212-250 | 290 | 55.0 | 16.2 | 1.24 | 16.27 | 11.78 | 8.40 | 3.33 | 40 |
| 8b | 1 side buffed** | 212-250 | 290 | 55.0 | 16.2 | 0.86 | 3.19 | 0.84 | 0.23 | 0.14 | 36 |
| 8c | 1 side buffed** w/adhesive*** | 212-250 | 290 | 55.0 | 16.2 | 0.89 | 5.72 | 1.17 | 0.37 | 0.23 | 38 |
| 8d | Cast onto Cu foil | 212-250 | 290 | 55.0 | 16.2 | 1.48 | 11.24 | 8.42 | 8.09 | 4.41 | 43 |
| 9 | No treatment | 212-250 | 375 | 55.0 | 16.2 | 1.33 | >100 | 74.29 | 44.40 | 7.38 | 32 |
| 10 | No treatment | 180-212 | 290 | 38.5 | 8.3 | 1.00 | >100 | >100 | >100 | 7.93 | 22 |
| 11a | No treatment | 212-250 | 290 | 38.5 | 8.3 | 1.04 | >100 | 12.01 | 15.66 | 6.63 | 29 |

TABLE 4a-continued

| Run | Treatment | Filler size, um | Magnet Gauss | Loading in solid wt % | Loading in solid vol % | Avg thickness mm | VR (ohm-cm) at PSI (avg of five samples each) | | | | Strain at 100 psi % |
|---|---|---|---|---|---|---|---|---|---|---|---|
| | | | | | | | 10 psi | 20 psi | 40 psi | 60 psi | |
| 11b | Cast onto Cu foil | 212-250 | 290 | 38.5 | 8.3 | 1.12 | 9.99 | 6.46 | 2.43 | 1.20 | 36 |
| 11c | Corona treated (d) | 212-250 | 290 | 38.5 | 8.3 | 0.85 | 5.33 | 20.03 | 3.18 | 1.58 | 31 |

**bottom (carrier) side buffed
***bottom (carrier) side buffed, conductive adhesive laminated onto buffed side after buffing
(a) possible contamination, therefore poorer than expected conductivity
(b) avg. w/o sample 5; sample 5 not conductive until 60 psi
(c) allowed to stand, in order to allow particles to settle before entering magnet
(d) treated bottom (carrier) side TABLE 4b

| Run | Treatment | Filler size um | Magnet Gauss | Loading in solid wt % | Loading in solid vol % | Loading in foam vol % | Loading in foam Lb/ft² |
|---|---|---|---|---|---|---|---|
| 12a | No treatment | 212-250 | 290 | 49.2 | 12.8 | 5.5 | 0.169 |
| 12b | 1 side buffed** | 212-250 | 290 | 49.2 | 12.8 | 5.5 | 0.169 |
| 13a | No treatment | 212-250 | 290 | 49.2 | 12.8 | 4.0 | 0.117 |
| 13b | 1 side buffed** | 212-250 | 290 | 49.2 | 12.8 | 4.0 | 0.117 |
| 14a | No treatment | 212-250 | 290 | 55.0 | 16.2 | 6.5 | 0.193 |
| 14b | 1 side buffed** | 212-250 | 290 | 55.0 | 16.2 | 6.5 | 0.193 |
| 15a | No treatment | 212-250 | 290 | 55.0 | 16.2 | 4.8 | 0.129 |
| 15b | 1 side buffed** | 212-250 | 290 | 55.0 | 16.2 | 4.8 | 0.129 |
| 16a | No treatment | 250-300 | 290 | 55.0 | 16.2 | 5.2 | 0.184 |
| 16b | 1 side buffed** | 250-300 | 290 | 55.0 | 16.2 | 5.2 | 0.184 |
| 17a | No treatment | 250-300 | 290 | 55.0 | 16.2 | 4.5 | 0.163 |
| 17b | 1 side buffed** | 250-300 | 290 | 55.0 | 16.2 | 4.5 | 0.163 |
| 18 | With top carrier | 250-300 | 1000 | 55.0 | 16.2 | | |
| 19 | With top carrier | 250-300 | 1000 | 55.0 | 16.2 | 7.6 | 0.376 |

| Run | Density pcf | Avg cell size um | Avg thickness mm | VR (ohm-cm) at PSI (avg of five samples each) | | | | Strain at 100 psi % |
|---|---|---|---|---|---|---|---|---|
| | | | | 10 psi | 20 psi | 40 psi | 60 psi | |
| 12a | 56 | 76 | 0.92 | 3.16 | 1.38 | 0.82 | 0.43 | 31 |
| 12b | 56 | 76 | 0.91 | 1.34 | 0.49 | 0.19 | 0.10 | 27 |
| 13a | 41 | 87 | 0.87 | 4.48 | 4.10 | 1.89 | 1.38 | 45 |
| 13b | 41 | 87 | 0.91 | 13.68 | 7.62 | 0.81 | 0.53 | 40 |
| 14a | 60 | 94 | 0.98 | 14.44 | 9.05 | 2.90 | 1.40 | 31 |
| 14b | 60 | 94 | 1.05 | 11.25 | 2.18 | 0.49 | 0.31 | 27 |
| 15a | 44 | 105 | 0.89 | 3.21 | 2.76 | 1.35 | 1.50 | 51 |
| 15b | 44 | 105 | 0.90 | 11.44 | 1.09 | 0.41 | 0.31 | 48 |
| 16a | 48 | 81 | 1.17 | 30.87 | 19.13 | 5.90 | 3.46 | 42 |
| 16b | 48 | 81 | 1.15 | 25.51 | 8.12 | 1.52 | 0.95 | 38 |
| 17a | 41 | 103 | 1.21 | 34.89 | 23.77 | 15.85 | 4.40 | 56 |
| 17b | 41 | 103 | 1.10 | 22.82 | 10.55 | 2.22 | 1.00 | 50 |
| 18 | | | 1.78 | >100 | >100 | >100 | 51.46 | 35 |
| 19 | 70 | 122 | 1.64 | >100 | >100 | >100 | 91.62 | 16 |

**bottom (carrier) side buffed

Runs 1, 5, 8, 12, 13, 14, 15, 16, 17 "b" vs. "a" show the improvement in conductivity achieved by buffing (grinding) the surface of the side adjacent the carrier, i.e., the bottom surface of the layer. However, in some cases, if the unbuffed sample already achieves good conductivity the positive effect is small, in other words, good performance is achieved without buffing in some cases. Buffing or grinding can be used to produce more consistent conductivity if the particular conditions to produce product are difficult to control.

Run 1c compared to 1b indicates the additional small improvement possible by buffing or grinding the top surface in addition to the bottom surface.

Runs 5c and 8c compared to 5b and 8b show the results of combining the samples with a conductive adhesive producing good conductivity suitable for use commercially as a conductive gasket or shield.

Runs 5d, 8d and 11b compared respectively to 5a, 8a and 11a show that directly casting on a copper foil produces good conductivity as is, without further buffing or other processing and is suitable for use as a conductive gasket or shield or as a grounding or contact pad, especially if combined with a conductive adhesive.

Run 11c shows that corona treating the bottom (carrier) surface can be used to improve the conductivity compared to no treatment.

Runs 1a, 2, 3, 6, and 10 compared to otherwise equivalent samples show that in this case a smaller particle size (180 to 212 microns) are not as conductive as those with a larger particle size (212 to 250 micron) at these thicknesses and conditions.

Runs 16a and 17a compared to 14a and 15a indicate that a larger particle size (250 to 300 micron) compared to the 212 to 250 micron particle size, at a high gauss level, produces poor conductivity. This suggests there is an optimal particle size for each desired thickness and condition range desired.

Runs 18 and 19 show that for these sample conditions that use of a top carrier does not produce the best results. However, the use of a top carrier in these cases produced some of the more compressible samples, which is desirable for some applications. As these samples were also very thick, it is believed that optimizing the conditions with a top carrier to produce low density, highly compressible material but at a smaller thickness, or optimizing the particle size and other parameters for the greater thicknesses, will produce good conductivity results.

Runs 7b vs 7a show that aging the foamed sample prior to exposure to the magnetic field produces poor conductivity. This suggests that the conductive and magnetic particles, having a high specific gravity, may sink to the bottom surface prior to magnet exposure, thus producing incomplete stacks.

Runs 4, 5a, 7a, 8a, 9, 11a, 12a, 13a, 14a, and 15a indicate that for a given particle size range a higher loading level provides better conductivity but that the gauss level, foam density and thickness can all effect the final conductivity versus compression performance and may be used to alter and control the desired final properties.

Example 5

To form a silicone foam, silicones resins (Dow Corning Silicone 8137), the filler microspheres as indicated in Table 3, and silicone cure inhibitor (1-octyn-3-ol from Aldrich Chemical Co.) were mixed in a Flaktek speed mixer, cast on a PET film with a controlled thickness, and a top carrier was placed on the foam. The foam was placed in an oven and exposed to an adjustable magnetic field to cure the foam. The samples were not mechanically foamed. In addition, foaming continued after application of the magnetic field. No removal of any outer layers was performed. Examination of each of the foams showed that the thickness of the foam was about the same as the average height of the cells of the foam.

Testing results are shown in Table 5.

TABLE 5

| Run | Filler type | Filler size um | Magnet Gauss | Loading in solid wt % | Loading in solid vol % | Avg Thickness mm | VR (ohm-cm) @ 10 psi | 20 psi | 40 psi | 60 psi | Strain at 60 psi % |
|---|---|---|---|---|---|---|---|---|---|---|---|
| 1 | NiSS | 150-180 | 1000 | 51 | 12 | 0.694 | >40 | 21.3 | 0.79 | 0.12 | 59 |
| 2 | Ni | 75-90 | 1000 | 66 | 18 | 0.75 | >40 | >40 | >40 | 37.1 | 56 |
| 3 | NiSS | 210-250 | 1000 | 47 | 10 | 0.891 | >40 | >40 | 4.9 | 0.31 | 60 |
| 4 | AgNi | 75-90 | 1000 | 63 | 16 | 0.55 | >40 | >40 | 16.36 | 2.78 | 60 |
| 5 | NiSS | 250-300 | 1000 | 51 | 12 | 1.04 | >40 | 5.9 | 0.01 | <0.01 | 63 |

NISS—Nickel-coated stainless steel spheres;
Ni—Nickel spheres;
AgNi—Silver-coated nickel spheres As can be seen from Table 5, the volume resistivities obtained at 60 psi in the Runs of Tables 4a and 4b are comparable in many instances to the volume resistivities obtained at 60 psi when the thickness of the silicone composite layer is limited to the largest diameter of the cells in the foams. In addition, certain of the compositions shown in Tables 4a and 4b have excellent conductivities at lower pressures, for example 20 psi. Thus, use of the methods described herein allows the manufacture of polymer foam composites with a wider range of properties, thicknesses, comparable volume resistivities at higher pressures, and improved resistivities at lower pressures.

The terms "first," "second," and the like as used herein do not denote any order, quantity, or importance, but rather are used to distinguish one element from another. The terms "a" and "an" do not denote a limitation of quantity, but rather denote the presence of at least one of the referenced item. All ranges disclosed within this specification are inclusive of the stated endpoint, and are independently combinable. All references are incorporated herein by reference in their entirety. Unless defined otherwise, technical and scientific terms used herein have the same meaning as is commonly understood by one of skill in the art.

While the invention has been described with reference to exemplary embodiments, it will be understood by those skilled in the art that various changes can be made and equivalents can be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention.

What is claimed is:

1. A method of manufacturing a polymer foam composite, the method comprising:
    forming an article having a first surface and an opposite second surface from a precursor composition, the precursor composition comprising
        a polymer foam precursor composition, and
        a filler composition comprising a plurality of magnetic, electrically conductive particles;
    mechanically foaming the precursor composition to form a plurality of cells in precursor composition prior to forming the article;
    applying a magnetic field to the foamed precursor composition, wherein the magnetic field is of a strength and applied for a time effective to align the electrically conductive, magnetic particles into mutually isolated chains between the first surface and the opposite second surface of the article,
    wherein the foaming is substantially complete prior to applying the magnetic field; and
    solidifying the polymer foam precursor composition to provide the polymer foam composite having a density of about 1 to about 125 pounds per cubic foot and a volume resistivity of about $10^{-3}$ ohm-cm to about $10^3$ ohm-cm at a pressure of 60 pounds per square inch.

2. The method of claim 1, wherein the solidifying is after aligning the electrically conductive metal particles into the mutually isolated chains.

3. The method of claim 1, further comprising removing an amount of the first and/or second surface of the solidified foam sufficient to at least partially expose the ends of the mutually isolated chains.

4. The method of claim 1, wherein the article is a layer, and forming the article comprises casting the polymer foam precursor composition onto a first carrier, wherein the first surface is disposed on and in contact with the first carrier.

5. The method of claim 4, further comprising removing an amount of the first surface of the solidified foam sufficient to at least partially expose the ends of the mutually isolated chains.

6. The method of claim 4, further comprising disposing a second carrier onto the second surface of the layer.

7. The method of claim 6, further comprising removing an amount of the first and second surface of the solidified foam sufficient to at least partially expose the ends of the mutually isolated chains.

8. The method of claim 4, wherein the first carrier is electrically conductive.

9. The method of claim 4, wherein the first carrier is magnetic, or magnetic and electrically conductive.

10. A method of manufacturing a polymer foam composite, the method comprising:
    mechanically foaming a precursor composition to form a plurality of cells in the precursor composition, wherein the precursor composition comprises:
        a polymer foam precursor composition, and
        a filler composition comprising a plurality of magnetic, electrically conductive particles;
    forming an article having a first surface and an opposite second surface from the mechanically foamed precursor composition;
    applying a magnetic field of a strength and for a time effective to align the magnetic, electrically conductive particles into mutually isolated chains between the first surface and the opposite second surface of the article, wherein the foaming is substantially complete prior to applying the magnetic field; and
    curing the polymer precursor composition to provide the polymer foam composite having a density of about 1 to about 125 pounds per cubic foot and a volume resistivity of about $10^{-3}$ ohm-cm to about $10^3$ ohm-cm at a pressure of 60 pounds per square inch.

11. A method of manufacturing a polymer foam composite, the method comprising:
    forming an article having a first surface and an opposite second surface from a precursor composition, the precursor composition comprising
        a polymer foam precursor composition, and
        a filler composition comprising a plurality of magnetic, electrically conductive particles;
    mechanically foaming the precursor composition to form a plurality of cells in precursor composition prior to forming the article;
    applying a magnetic field to the foamed precursor composition, wherein the magnetic field is of a strength and applied for a time effective to align the electrically conductive, magnetic particles into mutually isolated chains between the first surface and the opposite second surface of the article,
    wherein the foaming is substantially complete prior to applying the magnetic field;
    solidifying the polymer foam precursor composition; and
    removing an amount of the first and/or second surface of the solidified foam sufficient to at least partially expose the ends of the mutually isolated chains, to provide the polymer foam composite having a density of about 1 to about 125 pounds per cubic foot and a volume resistivity of about $10^{-3}$ ohm-cm to about $10^3$ ohm-cm at a pressure of 60 pounds per square inch.

12. A method of manufacturing a polyurethane foam composite, comprising:
    mechanically foaming a precursor composition comprising a polyisocyanate component, an active hydrogen-containing component reactive with the polyisocyanate component, a surfactant, a catalyst, and a filler composition comprising a plurality of magnetic, electrically conductive particles to form cells;
    casting the foamed precursor composition to form a layer having a first surface and an opposite second surface;
    exposing the layer to a magnetic field to align the magnetic, electrically conductive particles into mutually isolated chains that essentially continuously span the layer between the first surface and the second surface, wherein the foaming is substantially complete prior to applying the magnetic field; and
    curing the layer to produce the polyurethane foam composite having a volume resistivity of about $10^{-3}$ ohm-cm to about $10^3$ ohm-cm at a pressure of 60 pounds per square inch, and wherein the distance between the first surface and the second surface is greater than 1.5 times the average diameter of the cells.

13. A method of manufacturing a silicone foam comprising:
    casting a mixture comprising a polysiloxane polymer having hydride substituents, a catalyst, and a filler composition comprising a plurality of magnetic, electrically conductive particles; to form a layer having a first surface and an opposite second surface;
    mechanically foaming the mixture;
    curing the mixture in an applied magnetic field to align the magnetic, electrically conductive particles into mutually isolated chains that essentially continuously span the foam between a first surface and a second opposite surface of the foam,
    wherein the foaming is substantially complete prior to applying the magnetic field; and
    removing an amount of the first and/or second surface of the cured foam sufficient to at least partially expose the ends of the mutually isolated chains, to produce the silicone foam composite having a volume resistivity of about $10^{-3}$ ohm-cm to about $10^3$ ohm-cm at a pressure of 60 pounds per square inch.

14. The method of claim 1, wherein the foamed precursor composition comprises about 2 to about 20 volume percent filler composition.

* * * * *